US010377941B2

United States Patent
Kadhum et al.

(10) Patent No.: US 10,377,941 B2
(45) Date of Patent: Aug. 13, 2019

(54) STABILIZED CARBON NANOTUBE SUSPENSIONS

(71) Applicant: The Board of Regents of the University of Oklahoma, Norman, OK (US)

(72) Inventors: Mohannad J. Kadhum, Norman, OK (US); Daniel E. Resasco, Norman, OK (US); Jeffrey H. Harwell, Norman, OK (US); Ben Shiau, Norman, OK (US); Daniel P. Swatske, Houston, TX (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 308 days.

(21) Appl. No.: 15/514,375

(22) PCT Filed: Sep. 25, 2015

(86) PCT No.: PCT/US2015/052278

§ 371 (c)(1),
(2) Date: Mar. 24, 2017

(87) PCT Pub. No.: WO2016/049486

PCT Pub. Date: Mar. 31, 2016

(65) Prior Publication Data

US 2018/0215991 A1 Aug. 2, 2018

Related U.S. Application Data

(60) Provisional application No. 62/056,169, filed on Sep. 26, 2014.

(51) Int. Cl.

| | |
|---|---|
| ***C09K 8/536*** | (2006.01) |
| ***C09K 8/588*** | (2006.01) |

(Continued)

(52) U.S. Cl.

CPC ................ *C09K 8/588* (2013.01); *C09K 8/03* (2013.01); *C09K 8/58* (2013.01); *E21B 43/16* (2013.01);

(Continued)

(58) Field of Classification Search

CPC ........ C08K 3/041; C09K 8/536; C09K 8/588; C09K 2208/10

See application file for complete search history.

(56) References Cited

U.S. PATENT DOCUMENTS

| | | | |
|---|---|---|---|
| 3,993,131 | A | 11/1976 | Riedel |
| 5,009,798 | A | 4/1991 | House et al. |

(Continued)

FOREIGN PATENT DOCUMENTS

| | | | |
|---|---|---|---|
| RU | 2315978 | C1 | 1/2008 |
| RU | 2494036 | C2 | 9/2013 |
| WO | 2012154336 | A2 | 11/2012 |

OTHER PUBLICATIONS

Scheuerman, R.F.; "Guidelines for Using HEC Polymers for Viscosifying Solids-Free Completion and Workover Brines"; Journal of Petroleum Technology; Feb. 1983; 304-314.

(Continued)

*Primary Examiner* — Kenneth L Thompson

(74) *Attorney, Agent, or Firm* — Hall Estill Law Firm

(57) ABSTRACT

Stable CNT dispersions having a combination of polymeric dispersants, including at least one first dispersant and at least one second dispersant, wherein the second dispersant is stable under saline conditions, and methods of using the CNT dispersions in subterranean formations for enhancing oil recovery therefrom.

20 Claims, 16 Drawing Sheets

(51) Int. Cl.

| | |
|---|---|
| ***C09K 8/92*** | (2006.01) |
| ***C09K 8/03*** | (2006.01) |
| ***C09K 8/58*** | (2006.01) |
| ***E21B 43/16*** | (2006.01) |
| ***E21B 47/00*** | (2012.01) |
| *B82Y 30/00* | (2011.01) |
| *B82Y 40/00* | (2011.01) |

(52) U.S. Cl.
CPC .......... *E21B 47/0002* (2013.01); *B82Y 30/00* (2013.01); *B82Y 40/00* (2013.01); *C09K 2208/10* (2013.01); *Y10S 977/746* (2013.01); *Y10S 977/847* (2013.01)

(56) References Cited

U.S. PATENT DOCUMENTS

| | | | | |
|---|---|---|---|---|
| 8,720,562 | B2 | 5/2014 | Reddy et al. | |
| 9,133,709 | B2 * | 9/2015 | Huh | E21B 47/1015 |
| 2012/0015852 | A1 * | 1/2012 | Quintero | C09K 8/032 507/112 |
| 2012/0181019 | A1 * | 7/2012 | Saini | B82Y 30/00 166/250.01 |
| 2012/0277125 | A1 | 11/2012 | Korzhenko et al. | |
| 2013/0045897 | A1 * | 2/2013 | Chakraborty | B82Y 30/00 507/117 |
| 2013/0165353 | A1 * | 6/2013 | Mazyar | B82Y 30/00 507/219 |
| 2015/0225655 | A1 * | 8/2015 | Adams | C10G 25/003 516/138 |
| 2017/0015896 | A1 * | 1/2017 | Cox | C09K 8/03 |
| 2018/0127637 | A1 * | 5/2018 | Harwell | E21B 43/16 |
| 2019/0031951 | A1 * | 1/2019 | Johnson | C09K 8/60 |

OTHER PUBLICATIONS

Peru, D.A., et al.; "Surfactant-Enhanced Low-pH Alkaline Flooding"; SPE Reservoir Engineering; Aug. 1990; 327-332.
Hiemenz, P.C., et al.; "Principles of Colloid and Surface Chemistry"; 3rd Edition; Marcel Dekker, Inc.; 1997; 671 pages.
Hodge, R.M.; "HEC Precipitation at Elevated Temperature: An Unexpected Source of Formation Damage"; SPE Drilling & Completion; Jun. 1998; 88-91.
O'Connell, M.J., et al.; "Reversible water-solubilization of single-walled carbon nanotubes by polymer wrapping"; Chemical Physics Letters; 342; Jul. 13, 2001; 265-271.
Bandyopadhyaya, R., et al.; "Stabilization of Individual Carbon Nanotubes in Aqueous Solutions"; Nano Letters; vol. 2, No. 1; 2002; 25-28; published on the Web: Nov. 22, 2001.
Moore, V.C., et al.; "Individually Suspended Single-Walled Carbon Nanotubes in Various Surfactants"; Nano Letters; vol. 3, No. 10; 2003; 1379-1382; published on the Web: Sep. 9, 2003.
Attal, S.; "Determination of the Concentration of Single-Walled Carbon Nanotubes in Aqueous Dispersions Using UV-Visible Absorption Spectroscopy"; Anal. Chem.; Dec. 1, 2006; 78; 8098-8104.
Jaisi, D.P., et al.; "Transport of Single-Walled Carbon Nanotubes in Porous Media: Filtration Mechanisms and Reversibility"; Environmental Science & Technology; vol. 42, No. 22; 2008; 8317-8323; published on the Web: Oct. 22, 2008.
Shen, M., et al.; "Emulsions Stabilized by Carbon Nanotube-Silica Nanohybrids"; Langmuir; vol. 25, No. 18; 2009; 10843-10851; published on the Web: Jun. 17, 2009.
Rodriguez, E., et al.; "Enhanced Migration of Surface-Treated Nanoparticles in Sedimentary Rocks"; SPE International; SPE 124418; presented at the 2009 SPE Annual Technical Conference and Exhibition; New Orleans, LA, USA; Oct. 4-7, 2009; 21 pages.
Zhang, T., et al.; "Nanoparticle-Stabilized Emulsions for Applications in Enhanced Oil Recovery"; SPE International; SPE 129885; presented at the 2010 SPE Improved Oil Recovery Symposium held in Tulsa, OK, USA; Apr. 24-28, 2010; 18 pages.
Villamizar, L., et al.; "Interfacially Active SWNT/Silica Nanohybrid Used in Enhanced Oil Recovery"; SPE International; SPE 129901; presented at the 2010 SPE Improved Oil Recovery Symposium held in Tulsa, OK, USA; Apr. 26-28, 2010; 11 pages.
Drexler, S., et al.; "Amphiphilic Nanohybrid Catalysts for Reactions at the Water/Oil Surface in Subsurface Reservoirs"; Energy & Fuels; Mar. 7, 2012; 26; 2231-2241.
Baez, J.L., et al.; "Stabilization of Interfacially-Active-Nanohybrids/Polymer suspensions and Transport through Porous Media"; SPE International; SPE 154052; presented at the Eighteenth SPE Improved Oil Recovery Symposium held in Tulsa, OK, USA; Apr. 14-18, 2012; 11 pages.
PCT/US2015/052278; International Search Report and Written Opinion; dated Apr. 7, 2016; 7 pages.
Zhang, T, et al.; "Nanoparticle-Stabilized Emulsions for Applications in Enhanced Oil Recovery"; SPE International; SPE 129885; presented at the 2010 SPE Improved Oil Recovery Symposium held in Tulsa, OK; Apr. 24-28, 2010; 18 pages.
Ogolo, N.A., et al.; "Enhanced Oil Recovery Using Nanoparticles"; SPE International; SPE 160847; presented at the SPE Saudi Arabia Section Technical Symposium and Exhibition held in Al-Khobar, SA; Apr. 8-11, 2012; 9 pages.
McElfresh, P., et al.; "Stabilizing Nano Particle Dispersions in High Dalinity, High Temperature Downhole Environments"; SPE International; SPE 154758; presented at the SPE International Oilfield Nanotechnology Conference in Noordwijk, NL; Jun. 12-14, 2012; 6 pages.
Kadhum, M.J., et al.; "Propogation of Interfacially Active Carbon Nanohybrids in Porous Media"; Energy Fuels; vol. 27; Oct. 2, 2013; 6518-6527.

* cited by examiner

STABILIZED CARBON NANOTUBE SUSPENSIONS

CROSS-REFERENCE TO RELATED APPLICATIONS

The present application is a national stage application of a PCT application having International Application No. PCT/US2015/052278, filed Sep. 25, 2015, which claims priority to U.S. Provisional Application having U.S. Ser. No. 62/056,169, filed Sep. 26, 2014, which claims the benefit under 35 U.S.C. 119(e), the disclosure of which is hereby expressly incorporated herein by reference.

BACKGROUND

Interfacially active carbon nanotube hybrids (e.g., nanoparticles comprising polymer-wrapped carbon nanotubes) have potential applications in subterranean reservoir systems. For example, nanoparticles based on functionalized carbon nanotubes ("CNTs") may be utilized for enhanced oil recovery ("EOR") by lowering the water/oil interfacial tension upon adsorption or chemical reaction catalyzed by these nanoparticles.

However, challenges exist for successful propagation of carbon nanotube hybrids through porous media. Such nanoparticle dispersions must be stable in high salinity water and should not get trapped by either filtering effects of the small pore mouths or by adsorption on the walls of the rock or sand.

Thus, requirements for applications in reservoir systems include the ability to form stable dispersions and to effectively propagate through the reservoir porous medium under elevated temperature and salinity conditions, which are typical in geologic formations exploited during commercial operations. Therefore, various embodiments of the presently described inventive concepts are directed to compositions and methods for stabilizing and propagating carbon nanotubes, particularly for subterranean reservoir development applications.

BRIEF DESCRIPTION OF THE DRAWINGS

Several embodiments of the presently disclosed inventive concepts are hereby illustrated in the appended drawings. It is to be noted however, that the appended drawings only illustrate several typical embodiments and are therefore not intended to be considered limiting of the scope of the presently disclosed inventive concepts. Further, in the appended drawings, like or identical reference numerals or letters may be used to identify common or similar elements, and not all such elements may be so numbered. The figures are not necessarily to scale, and certain features and certain views of the figures may be shown as exaggerated in scale or in schematic in the interest of clarity and conciseness. Various dimensions shown in the figures are not limited to those shown therein and are only intended to be exemplary.

FIG. 4(*b*) shows the number of rotations of PVP40 around a P-MWNT based on angle and diameter.

FIG. 6(*b*) is a graphical representation of adsorption of P-MWNTs in a 10% brine solution.

FIG. 9(*b*) shows an effect of pretreatment of sand on adsorption of P-MWNTs at 50° C.

FIG. 10(*b*) depicts differences in propagation (normalized concentration vs. pore volume) of CNTs when HEC is the only dispersant versus using a PVP+HEC dual dispersant system.

FIG. 12(*b*) is a graphical representation of differences in MWNT propagation (measured as normalized concentration vs. pore volume) for different concentrations of HEC-10.

FIG. 13(*b*) is a graphical representation of differences in MWNT propagation (measured as normalized concentration vs. pore volume) for different types of polymer pre-flush in a dual dispersant system.

FIG. 15(*b*) is a graphical representation of differences in MWNT propagation (measured as normalized concentration vs. pore volume) in a dual dispersant system as affected by filtration of the dispersion.

FIG. 16(*b*) is a graphical representation of differences in MWNT propagation (measured as normalized concentration vs. pore volume) in a dual dispersant system as affected by flow rate.

FIG. 17(*b*) is a graphical representation of adsorption of P-MWNTs using two different first dispersants (PVP and GA) at 50° C.

FIG. 21(*b*) is a graphical representation of HEC-10 (2000 ppm) viscosity measurements with different treatment times at 90° C. under anaerobic conditions.

FIG. 22(*b*) is a visual observation of Gum Arabic (5000 ppm) treated at 90° C. under anaerobic conditions.

FIG. 28(*b*) is a graphical representation of an effect of core permeability (253 mD vs. 460 mD) on cumulative recovery of a P-MWNT/GA/HEC-10 dispersion.

FIG. 29(*b*) is a digital photograph of a core plug face after propagation of MWNT through a core having a permeability of 253 mD.

FIG. 30(*b*) is a graphical representation of an effect of oil on cumulative recovery of a P-MWNT/GA/HEC-10 dispersion.

FIG. 31(*b*) is a digital photograph of a core face of a core used in FIGS. 31(*a*) and (*b*) with oil.

FIG. 33(*b*) is a graphical representation of a comparison of an effect of core thickness on the cumulative recovery of MWNTs from a P-MWNT/GA/HEC-10 dispersion based on percent (%) recovery.

DETAILED DESCRIPTION

Figure 1:
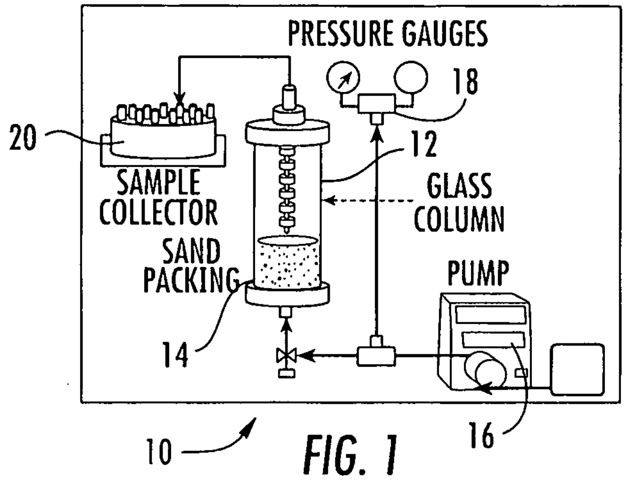
FIG. 1 depicts a packed column setup for analysis of propagation through porous media.

Before describing various embodiments of the presently disclosed inventive concepts in more detail by way of exemplary descriptions, examples, and results, it is to be understood that the presently disclosed inventive concepts are not limited in application to the details of systems, methods, and compositions as set forth in the following description. The presently disclosed inventive concepts are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances, features which are well known to persons of ordinary skill in the art have not been described in detail to avoid unnecessary complication of the description.

Unless otherwise defined herein, scientific and technical terms used in connection with the presently disclosed inventive concepts shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims and/or the specification is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the term "about" is used to indicate that a value includes the inherent variation of error for the composition, the method used to administer the composition, or the variation that exists among the study subjects. Further, in this detailed description and the appended claims, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Further, an embodiment having a feature characterized by the range does not have to be achieved for every value in the range, but can be achieved for just a subset of the range. For example, where a range covers units 1-10, the feature specified by the range could be achieved for only units 4-6 in a particular embodiment.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time. The term "stable" as used herein in reference to a polymer molecule means that the molecule referred to substantially maintains its tertiary conformation under the particular conditions identified. The term "stable" as used herein in reference to a dispersion or suspension of particles means that the dispersion or suspension substantially maintains the particles in a dispersed or suspended state without partitioning or settling of the particles under the particular conditions identified.

"API" brine refers to an aqueous 10% saline solution containing 8 wt % NaCl and 2 wt % $CaCl_2$. A pore volume ("PV"), as used herein, refers to the volume of fluid required to replace (flush out) the water or fluid in a certain volume of a saturated porous medium, in this case a core of Berea Sandstone™ or a column of Berea sand.

The term "breakthrough" in general refers to the very first detection of nanoparticles, polymer, surfactant or tracer in an effluent from a production well after being injected into a subterranean formation via an injection well. In the present disclosure, "breakthrough" refers to the first detection of nanoparticles or polymer in an effluent from a core of Berea Sandstone™ or a column of Berea sand, and thus is representative of breakthrough in an oil well system. In the present context, a faster breakthrough means better propagation of CNTs through a rock formation and less interaction between CNTs and sand or rock particles or interfaces.

The following abbreviations are used: CNTs: carbon nanotubes; SWNTs: single-walled carbon nanotubes; MWNTs: multi-walled carbon nanotubes; P-SWNTs: purified single-walled carbon nanotubes; P-MWNTs: purified multi-walled carbon nanotubes; PVP: polyvinyl pyrrolidones (e.g., 5 kD to 1300 kD, including but not limited to 10 kD to 100 kD); GA: Gum Arabic; XA: Xanthan gum; GG: Guar gum; PAM: polyacrylamides; PAA: polyacylamides; PVA: polyvinyl alcohols; HEC: hydroxyethyl celluloses; NMR: Nuclear Magnetic Resonance; EPR: Electron Paramagnetic Resonance. Carbon nanotube hybrids ("CNT hybrids") may also be referred to herein as carbon nanohybrids. As noted above, where used herein, the terms "dual dispersant system," "binary system," and "binary dispersant system" refer to CNT dispersions comprising at least two types of polymeric dispersants.

In at least one embodiment, the presently disclosed inventive concepts are directed to compositions and methods for dispersing CNTs using a combination of polymers. Suspensions (dispersions) of CNTs (e.g., P-SWNTs or P-MWNTs), in deionized ("DI") water and highly saline brine are provided using commercially available nonionic polymers, including at least one first dispersant and at least one second dispersant. For example, in certain embodiments, the dispersion is stable at a salinity of about 10% to about 20% at a temperature in a range of about 25° C. to about 50° C. In certain other non-limiting embodiments, the dispersion is stable at a salinity in a range of at least about 10% to about 25% by weight at a temperature in a range of about 20° C. to about 90° C. In certain embodiments, the first dispersant is a short molecular weight, highly polarizable polymer. The first dispersant is used to debundle the CNTs substantially into individual or loosely organized nanotubes to form highly dispersed CNTs. Examples of the first dispersant include, but are not limited to, PVP (e.g., PVP40), PAA, PVA, and gums including but not limited to GA, XA, GG, agar, alginic acid, beta-glucan, carrageenan, chicle gum, dammar gum, gellan gum, gum ghatti, gum tragacanth, karava gum, locust bean gum, mastic gum, spruce gum, tam gum, and diutan.

In certain embodiments, the second dispersant is a salt tolerant polymer and can result in steric stabilization of the highly dispersed CNTs to form CNT hybrids in dispersions which are stable under high salinity and elevated temperatures. For example, in certain embodiments, the second dispersant is stable at a salinity of about 10% to 20% at a temperature in a range of about 25° C. to about 50° C. In certain other non-limiting embodiments, the second dispersant is stable at a salinity in a range of at least about 10% to about 25% by weight at a temperature in a range of about 25° C. to about 90° C. Examples of the second dispersant include, but are not limited to, cellulosic derivatives such as hydroxyethyl celluloses (such as HEC-10 and HEC-25), hydroxypropyl cellulose, carboxymethyl cellulose, and carboxymethylhydroxyethyl cellulose that are stable at a salinity level in a range of from about 10% to about 25% by weight. In certain non-limiting embodiments, the CNTs in the dispersions have a concentration in a range of from about 2 ppm to about 1000 ppm, for example in a range of about 20 ppm to 500 ppm or in a range of about 50 ppm to about 250 ppm.

Using the first and second dispersants in dispersing CNTs, such as P-MWNTs in DI water, is successful in producing stable dispersions that can remain stable for months. This is done by disrupting the hydrophobic interface of the CNTs with water and the tube-tube interaction in aggregates. For such a process, the net energy gain from losing the hydrophobic surface achieved by shielding the nanotube from the water is larger than the energy penalty for forcing a linear polymer into wrapping around a nanotube. In at least one embodiment, dispersions of the presently disclosed inventive concepts predominantly comprise CNT hybrids having sizes such that they can pass through a filter having "one micron" pore sizes.

In order to have substantial dispersion stability, the electrostatic repulsive forces and van der Waals attractive forces should be properly balanced. Salinity has a negative effect on nanoparticles stabilized by the first dispersant alone. Using a combination of at least two polymeric dispersants as described herein provides an improved nanotube propagation through subterranean rock formations (such as but not limited to at least 80% propagation), even under high salinity conditions. A role of the first dispersant, in certain non-limiting embodiments comprising moderately low molecular weight polymer molecules (for example, 40-55 kD), is to strongly interact with the highly entangled nanotube aggregates that form when the "as-prepared" nanotubes are placed in water and disaggregate them into individualized CNTs, forming CNT/first dispersant composites. The second dispersant, comprising polymer molecules that have a greater salinity tolerance than the first dispersant, is used to prevent aggregation of the CNT/first dispersant composites by forming carbon nanohybrids comprising CNT/first dispersant composites at least partially surrounded by second dispersant molecules. Formed into the carbon nanohybrids, adsorption of the individual nanotubes to the rock wall and/or blockage of the rock pores is minimized. In certain embodiments, the CNT hybrid dispersion composition of presently disclosed inventive concepts may be injected into a subterranean formation, for example a formation comprising a reservoir of petroleum and/or natural gas. The dispersion composition can improve oil and/or gas recovery (e.g., in an EOR application), for example, by reducing oil-water interfacial tension. In some embodiments, the composition can be used as modifiers of transport properties, as well as nanoscale vehicles for catalyst and contrast agents. In-situ catalysis may be used to modify interfacial tension and wettability of rock walls, for example.

EXAMPLES

The presently disclosed inventive concepts, having now been generally described, will be more readily understood by reference to the following examples and embodiments, which are included merely for purposes of illustration of certain aspects and embodiments of the presently disclosed inventive concepts, and are not intended to be limiting. The following detailed examples of systems and/or methods of use of the presently disclosed inventive concepts are to be construed, as noted above, only as illustrative, and not as limitations of the disclosure in any way whatsoever. Those skilled in the art will promptly recognize appropriate variations from the various structures, components, compositions, procedures, and methods.

In the experiments described in the following examples, the adsorption and propagation of various types of CNT dispersions has been assessed, thus providing information about which systems of dispersant polymers result in a reduced or decreased interaction (adsorption) of CNTs with the rock samples. These analyses are directly relatable to how such dispersions would propagate in natural subterranean rock formations. Validation of the results was confirmed by column propagation studies using crushed sandstone columns and core flooding. It is thus feasible to extrapolate the extent of adsorption and propagation of CNT dispersions injected into rock in a laboratory system to a subterranean reservoir-sized system, for example for EOR.

Example 1

As noted above, in at least one embodiment, a composition is provided by combining at least one first dispersant, at least one second dispersant having a high tolerance to salinity, and a plurality of UNTs. A non-limiting example of how a CNT hybrid composition of the presently disclosed inventive concepts is formed is described below.

Materials

P-MWNTs were commercially obtained from SouthWest Nanotechnologies Inc. ("SWeNT"), Norman, Okla. In the SWeNT manufacturing process, nanotube growth can be controlled to a desired length (e.g., ~1 micron) and number of walls (e.g., ~10) by adjusting the synthesis conditions. The alumina support and metal catalysts used in the growth process of the MWNTs are later dissolved by an acid attack leaving a purified P-MWNT product with, e.g., greater than 98% carbon content. The hydrophilicity of the P-MWNTs can be increased by oxidation, creating hydrophilic carboxylic groups on the nanotube surface whereby the interfacial activity of the carbon nanotube hybrids produced herein can be adjusted.

DI water was purified and deionized using three ion exchange units commercially obtained from Cole Parmer. Polyvinyl pyrrolidone polymer of molecular weight of 40,000 Daltons ("D") (PVP40) was commercially obtained from Sigma Aldrich, and hydroxyethyl cellulose (HEC-10) and (HEC-25) was commercially obtained from Dow Chemicals. Berea Sandstone™ cores were crushed with a ceramic mortar and sieved through a set of standard sieves (Sieves designations: #60/250 μm, #200/75 μm) and used in a range between 75 μm to 250 μm. Berea Sandstone™ cores are widely recognized in the petroleum industry as an optimal stone for testing chemical propagation through subterranean hydrocarbon-bearing rock formations. Sodium and calcium chlorides were commercially obtained from Sigma Aldrich. The column used in this study was a low-pressure glass Chromaflex, commercially obtained from Kimble/Kontes Co.

Procedures

P-MWNTs were dispersed in brine or DI water with PVP40 at the desired concentrations (indicated later) by sonication with a 600 W, 20 KHz horn-sonicator. HEC-10 stock solution was prepared and added to the dispersed solution of P-MWNTs at a HEC-10:PVP40 ratio of 3:1. Subsequently, the solution was sonicated again and centrifuged for one hour at 2000 rpm to eliminate any non-dispersed large aggregates of P-MWNT that settled out of suspension. The adsorption experiments were made by adding 10 ml of dispersion into vials containing 2 g of crushed Berea Sandstone™. A stirring bar was added and the vials were sealed and placed on a stirrer for 24 hours. After this period, the concentrations of all suspensions was measured on an UV-Vis spectrometer and compared to calibration standards of known concentrations. The differences in initial and final P-MWNT concentrations reflects the amount adsorbed to the sand in each measurement. The experiments were repeated at a wide range of CNT concentrations and polymer combinations. The salinity was varied up to 10 wt %, keeping a constant Na:Ca ratio of 4:1 in all experiments in which brine was used.

FIG. 1 shows a schematic of a system 10 used for the measurements of particle propagation through packed porous media. Glass columns 12 were packed with dried medium 14, such as, by way of example, sand; different liquid suspensions according to each experiment were injected using a peristaltic pump 16 connected to an injection line with pressure gauges 18 that can measure pressure drops across the column. A sample collector 20 was used to collect the liquid outflows (effluents) from the columns. The exposed front surface of the column was referred to as the "face." To characterize the Berea sand packing, columns 6 inches long and 1 inch wide in diameter were used. After the columns were packed with sand, the porous media were characterized by measuring porosity and permeability. Porosity was measured by injecting water at 0.3 ml/min until no air bubbles were detected in the effluent; the pore volume ("PV") is the difference between the total amount of the injected water and the amount of recovered water in the effluents plus the water remaining in the lines. Permeability was estimated from a conventional relationship between pressure drop and flow rate. The pressure drop through the sand packing was measured at different flow rates between 0.30 and 20 ml/min. The measured values for porosity and permeability were 35% and 4.1 D, respectively. For the crushed Berea sand, the grain size range used was 75-250 μm. Most experiments were run in 1 inch (L)×1 inch (D) sand packed in glass columns, except when the column length was varied. The tests were run by injecting 5 or 10 pore volumes ("PV") of the particle dispersion followed by post water injection until no particles were detected in the effluents (usually another 5 PV of water flush were necessary to achieve undetectable concentration of particles).

Adsorption Studies

Figure 2A:
FIGS. 2(*a*) and 2(*b*) depict polymer wrapping of carbon nanotubes ("CNTs") when (1) PVP (polyvinyl pyrrolidone) alone is combined with CNTs and then with salts causing reaggregation of the CNTs, (2) PVP and HEC (hydroxyethyl cellulose) are combined simultaneously with CNTs, and (3) PVP and HEC are combined sequentially with CNTs. Polymer systems having at least two dispersant types are referred to herein as "dual dispersant" systems or alternatively as "binary dispersant" systems.
Figure 2B:
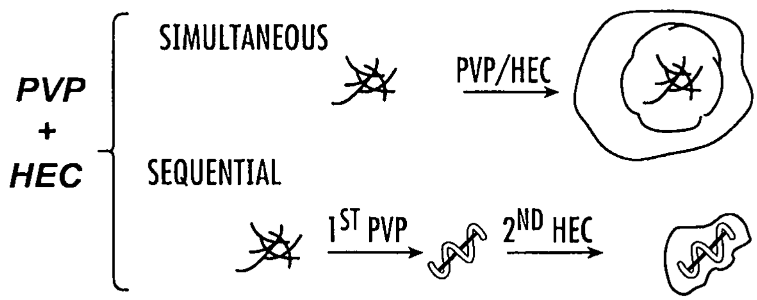

Effect of Polymer Addition Method on Dispersion Stability and Extent of Adsorption Stable dispersions of P-MWNT hybrids were produced in DI water using PVP40 and hydroxyethyl cellulose (HEC-10) by sequential and simultaneous addition. In the sequential addition mode, a suspension containing P-MWNTs and PVP40 was sonicated, then added to the HEC-10, and sonicated for a second time. In the simultaneous addition, P-MWNTs were dispersed in a solution containing the two polymers (PVP40 and HEC-10). These two cases were compared with a case where PVP40 was used as the only dispersant. It was found that the sequential addition resulted in the least adsorbed amount and most stable dispersion even at high salinity. FIGS. 2(*a*) and 2(*b*) summarize the concept behind the method of simultaneous and sequential polymer addition for dispersing P-MWNTs. Combining P-MWNTs and a PVP40 solution resulted in a stable dispersion. However, these dispersions are salt intolerant, and nanotubes tend to aggregate once there is strong ionic interaction present in the solution. However, inclusion of a second, salt-tolerant dispersant, after initially combining P-MWNTs with a first dispersant (e.g., PVP40) has been discovered to maintain the nanotubes separated by steric repulsion. In this case, the dispersion exhibits tolerance to high levels of salinity, and is very stable at room temperature and at above-room temperature. In the case of the simultaneous, rather than sequential, addition of both dispersants, large aggregates of P-MWNTs are formed rather than more individualized carbon nanohybrids. Without the initial dispersion of the P-MWNT aggregates by the first dispersant, the P-MWNT aggregates cannot be individually separated before they are surrounded by the second dispersant molecules, which results in a less stable dispersion with larger aggregates that can be expected to block pore throats in the rock matrix. Therefore, the experiments below used the sequential method of dispersant addition to disperse P-MWNTs, unless otherwise stated.

Figure 3:
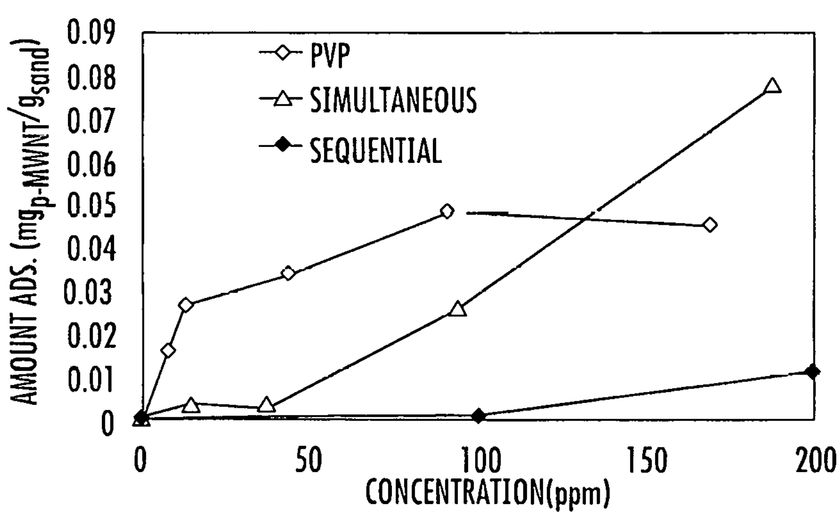
FIG. 3 is a graphical representation of the amount of P-MWNTs (purified multi-walled carbon nanotubes) adsorbed onto sand using different polymer systems in deionized ("DI") water.

Experiments were performed to compare all three methods of dispersion in DI water as explained earlier. FIG. 3 shows the comparison between the three dispersion methods explained earlier: sequential addition of dispersants, simultaneous addition of dispersants, and dispersal in only PVP40. In FIG. 3, the x-axis is the equilibrium concentration (final concentration), which is the concentration of P-MWNTs in equilibrium with Berea sand after one day of contact. The amount adsorbed to the sand is calculated from the difference in P-MWNT concentration from the initial and final dispersion.

The dispersions used to determine the adsorption isotherms shown in FIG. 3 were prepared in three different methods: (1) sequential addition, (2) simultaneous addition, and (3) addition of first dispersant only. The dispersion used to determine the adsorption isotherm for the sequential method (method 1) was prepared by dispersing P-MWNTs in DI water solution containing PVP40 (first dispersant) by sonication for 2 hours. Then, a HEC-10 (second dispersant) solution was added such that the ratio of HEC-10 to PVP40 was 3:1, and the total polymer concentration was 1000 ppm. The combined mixture was further sonicated for 30 minutes after the addition of HEC-10. The dispersion used to determine the adsorption isotherm for the simultaneous method (method 2), was prepared by dispersing P-MWNTs in a solution containing 1000 ppm of both PVP40 and HEC-10 polymer with the same polymer ratio as in the sequential case. This solution was sonicated for two hours. The dispersion used to determine the adsorption isotherm for the first dispersant alone method (method 3), was prepared by dispersing P-MWNTs in a DI water solution that had 1000 ppm of only PVP40 as the dispersant. A number of P-MWNT concentrations have been tested ranging between 20 to 200 ppm for all experiments. All solutions, before mixing them with the sand, were centrifuged at 2000 rpm for one hour to settle non-dispersed P-MWNTs. The adsorption experiments were done according to the procedure described above for measuring CNT adsorption to the sand in the column.

FIG. 3 clearly shows the beneficial effect of using sequential addition of the two types of dispersant polymers in creating stable dispersion and reducing adsorption. PVP is known as an effective dispersant for carbon nanotubes in aqueous solution as it can disrupt the hydrophobic interface with water and the tube-tube interaction in aggregates. Without wishing to be bound by theory, the secondary dispersant used in this example, HEC-10, is hypothesized to create steric repulsion against agglomeration and nanotube-rock interaction. Without wishing to be bound by theory, it is believed that by using the two polymers together (simultaneous addition), large poorly dispersed CNT/PVP composites were encapsulated by the secondary polymer, forming relatively large aggregated particles. In comparison, the dispersion produced by the sequential method appears to have produced smaller particles. By dispersing P-MWNTs first using the relatively low molecular weight polymer PVP40, the nanotubes are individually separated and enwrapped (partially surrounded) by the PVP molecule. Then, when HEC-10 is subsequently added, the HEC-10 polymer can wrap around individual CNT/PVP composites rather than just large agglomerates when the two dispersants are added together. By using PVP40 alone (method 3), a stable dispersion was obtained, and moderate adsorption of P-MWNTs onto the sand was observed. However, the amount of adsorption of the PVP40-only system was considerably greater than the amount observed with the dual dispersant system dispersion prepared by the sequential method (method 1).

Figure 4A:
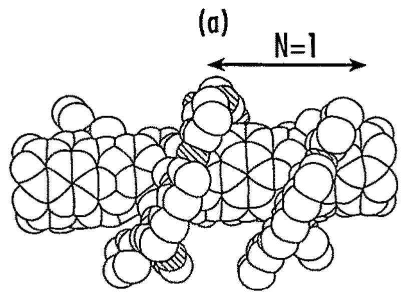
FIG. 4(*a*) shows a visualization of a polymer (PVP40) wrapped around a P-MWNT.
Figure 4B:
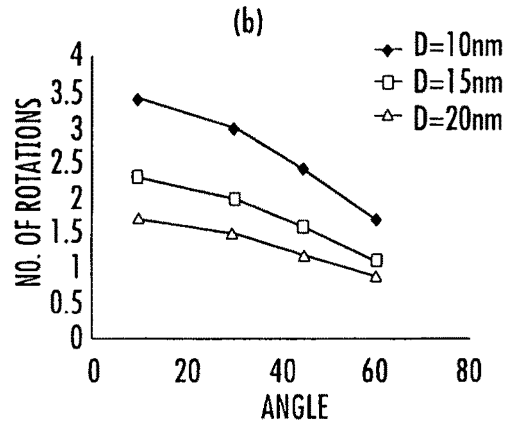

FIG. 4(*a*) shows a schematic drawing (not to scale) of a possible configuration of a PVP40 molecule wrapped around a nanotube. The image was created using Marvin space free software commercially available from ChemAxon. In this case, it is hypothesized that PVP40 is wrapped helically around a single-walled nanotube. By performing a simple calculation, one can estimate how many rotations a single polymer strand could wrap around a P-MWNT of a diameter ranging between 10 nm and 20 nm and an angle ranging between 10 and 60 degrees. An angle of zero was considered as a complete one ring, perpendicular to the nanotube. FIG. 4(*b*) shows the results of this calculation. It is demonstrated that a single strand of PVP40 could wrap about 1 to 3 times around the diameter of a P-MWNT. This calculation is in agreement with the assumption that PVP can physically wrap around nanotubes and stabilize their dispersion. In at least one embodiment, it is believed that a first dispersant polymer having a molecular weight ("MW") of 40,000 Daltons (e.g., PVP40) provides high dispersion of the CNTs.

Figure 5:
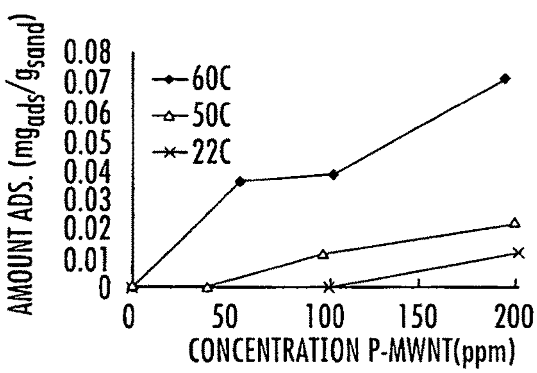
FIG. 5 is a graphical representation of adsorption isotherms of P-MWNTs dispersed using two polymers (HEC-10 and PVP40) in DI water.

Adsorption of P-MWNT Using PVP40 and HEC-10 Polymers at Variable Temperature and Salinity In order to understand the effects of temperature on adsorption, experiments were done at elevated temperatures. For the following adsorption experiments, the dispersion is prepared using the sequential method (method 1) as previously described with a fixed total polymer concentration of 1000 ppm and a constant ratio between HEC-10 and PVP40 of 3:1. FIG. 5 shows the adsorption amounts at a number of temperatures. This was done by placing the vials on a heating plate and using a temperature controller to keep the temperature constant throughout the adsorption experiment. As indicated in FIG. 5, it was observed that the adsorption increased with increasing temperature. Without wishing to be bound by theory, this behavior could be explained by the reduction in thermal stability of polymers at high temperatures which affects the dispersion stability at higher temperature or possibly by the polymers reaching the phase separation temperature.

Figure 6A:
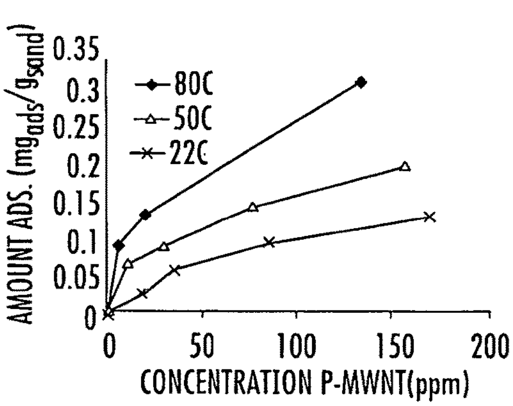
FIG. 6(*a*) is a graphical representation of adsorption of P-MWNTs in 3% brine solution.
Figure 6B:
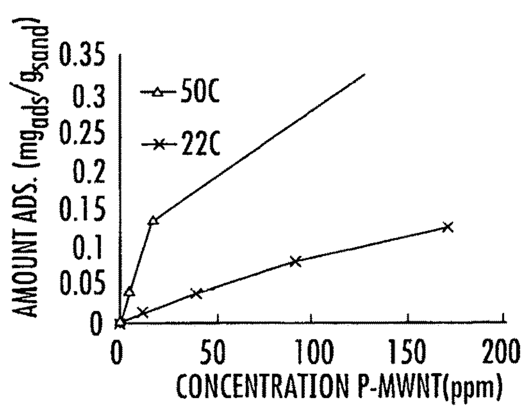
Figure 7:
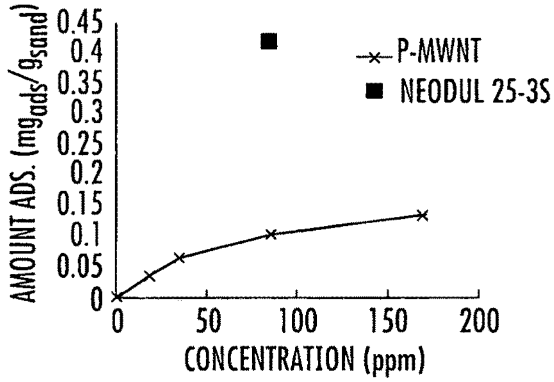
FIG. 7 is a graphical representation of an adsorption comparison of P-MWNTs versus Neodol 25-3S at 3% salinity. Adsorption of Neodol 25-3S is represented in the graph as a single plotted point.

FIGS. 6(*a*) and (*b*) demonstrate an effect of temperature on adsorption for 3% and 10% (by weight) salinity solutions, respectively. In this case, the saline solution was prepared prior to the experiment by using a constant ratio of sodium chloride to calcium chloride of 4:1. Comparing the adsorption at 22° C. for the cases of 3% and 10% salinity with the case of DI water, an increase in adsorption due to the effect of salinity is observed. Without wishing to be bound by theory, the effect of salinity on adsorption can be explained by the fact that the electric double layer decreases significantly as ionic strength increases. Since the Debye length of the P-MWNT decreases with increasing salinity, tubes can approach each other more closely than in DI water. In this case, the van der Waals attraction forces between the particles have more influence, resulting in faster particle agglomeration and higher adsorption. In both FIGS. 6(*a*) and (*b*), also observed is a trend of increased adsorption with temperature, which is similar to what was observed in FIG. 5 with a DI water case. FIG. 7 shows a comparison of the adsorption of a typical surfactant (Neodol 25-3S) to crushed Berea Sandstone™, and the adsorption of P-MWNT at the equivalent testing conditions. This figure shows the low adsorption values observed for P-MWNTs in comparison to Neodol 25-3S. The latter was about 0.42 mg/g, while after pretreatment, adsorption of the former was only about 0.02 mg/g under similar conditions. That is, adsorption of P-MWNTs was about 20 times lower.

Effect of Pretreatment with Polymers on Adsorption

Figure 8:
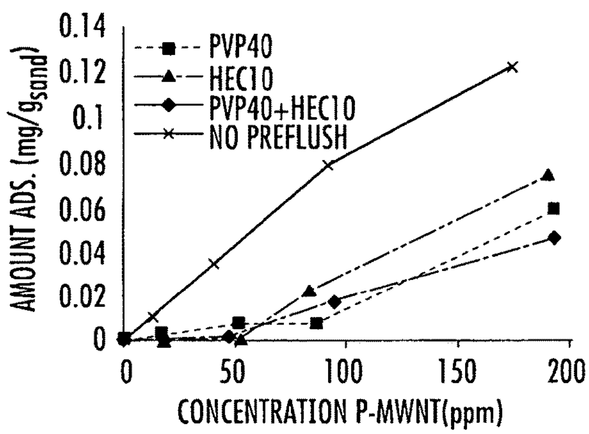
FIG. 8 is a graphical representation of an effect of pretreatment of crushed Berea Sandstone™ with various polymers on adsorption of P-MWNTs.

Adsorption to the crushed Berea Sandstone™ can be reduced by occupying the available adsorption sites with polymers. Therefore, a step was added to the experiment to confirm this theory: pre-treat the sand with a polymer solution. Once some of the available adsorption sites in Berea sand have been covered with a polymer, the dispersion will adsorb less to the Berea sand. The adsorption experiments in this part were done by adding 5 ml of polymer/brine solution without nanoparticles present in the solution and stirring for one hour at room temperature. Then 5 ml of P-MWNT dispersion was added to pre-treat the sand, and the mixture was stirred for 24 hours. Then, the absorbed amount was quantified using UV-Vis spectrometry. The brine concentration was kept constant in all batches, including the pretreatment polymer solution at 10% by weight. It was found that the adsorption amount was much lower when the sand was first pretreated with a polymer solution. The particle adsorption decreased by more than 50% using pretreatment. This indicates that available adsorption sites were partially saturated by polymer adsorption to the sand. FIG. 8 shows adsorption at 22° C. for the different systems of polymers studied to identify which polymer system best prevents particle adsorption. Three pre-treatment polymers were studied: 1000 ppm of PVP40 as the only dispersant, 1000 ppm of HEC-10 as the only dispersant, and 1000 ppm of a combination of HEC-10 and PVP40 polymers (at a ratio of 3:1, respectively). All pretreatment experiments resulted in reduced nanotube adsorption to the sand; however, it was observed that pretreatment with the mixture of both polymers (HEC-10 plus PVP40) provided the greatest reduction in nanotube adsorption.

Figure 9A:
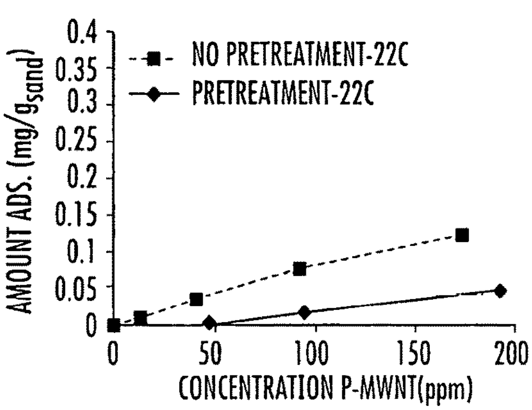
FIG. 9(*a*) shows an effect of pretreatment of sand on adsorption of P-MWNTs at 22° C.
Figure 9B:
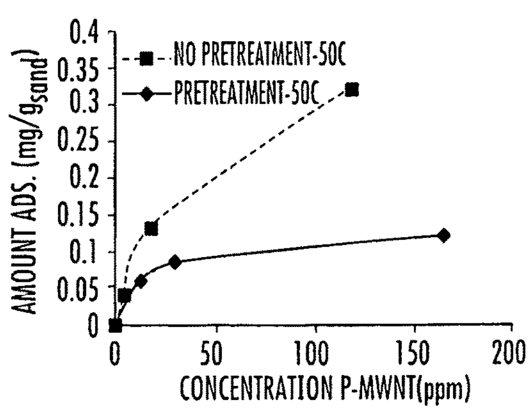

The nanotube adsorption at higher temperatures was also tested, and it was confirmed that pretreatment still reduces adsorption at higher temperatures. FIGS. 9(*a*) and (*b*) clearly show this effect for 22° C. and 50° C., respectively. As demonstrated above, adsorption of nanotubes on a pretreated sand column was more than 20 times lower than that of a typical surfactant.

Column Studies

Figure 10A:
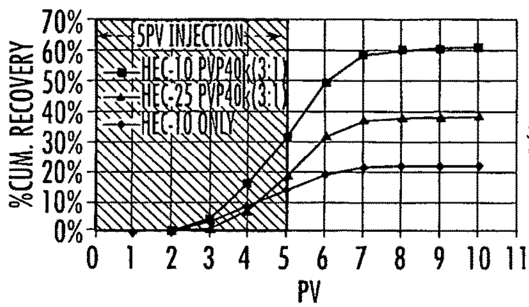
FIG. 10(*a*) depicts differences in propagation (cumulative particle recovery vs. pore volume) of CNTs when HEC is the only dispersant versus using a PVP+HEC dual dispersant system.
Figure 10B:
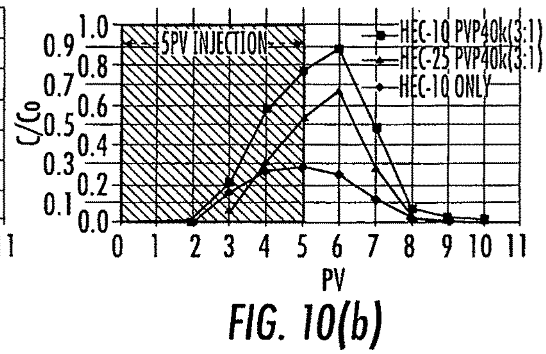

The propagation of carbon nanotubes was studied under high salinity environments using API brine. Propagation was studied for dispersions created by using PVP40/HEC-10 as first/second dispersants, PVP40/HEC-25 as first/second dispersants, and HEC-10 as the only dispersant. The ratios for those dual dispersant systems were 3:1 HEC:PVP. FIGS. 10(*a*) and (*b*) show results for these three columns by showing plots of cumulative particle (carbon nanotubes) recovery and normalized concentration versus pore volumes injected, respectively. For these experiments, 5 pore volumes of dispersion composition was injected (represented by the shaded areas in FIGS. 10(*a*) and (*b*)), and displaced by 5 pore volumes of brine. The first observation is the differences between the dual dispersant systems and the single dispersant system (HEC-10 only). The particle recovery for the single dispersant HEC-10 system was 2-3 times lower than that of the dual dispersant systems. This demonstrates that using a dual dispersant system facilitates improved transport of the nanoparticles in porous media. The dispersion created using HEC-10 as the only dispersant (i.e., a single dispersant system) produced larger particle sizes leading to cake formation that began to hinder effective particle transport as the size of the filter cake grew larger. The coloration of the sand behind the face (not shown) was much lighter than the sand that was treated with the dual dispersant systems indicating that only a small number of particles reached this regime of the sand pack, and the major mechanism of retention in this column was due to filtration at the sand face. Additionally, it was observed that the dispersion created using HEC-25/PVP40 produced particles large enough to be filtrated as they moved through the sand pack. The sand pack used for injection of the HEC-10/PVP40 system showed negligible cake formation, and the color coloration of the sand pack was uniform in color, indicating that the main mechanism of retention in this case was particle adsorption rather than filtration. Moreover, the particle transport using the HEC-10/PVP40 system would not cause sudden permeability losses in the formation. This was also in agreement with the adsorption studies mentioned before.

Optimization of Polymer in Dispersion

Figure 11:
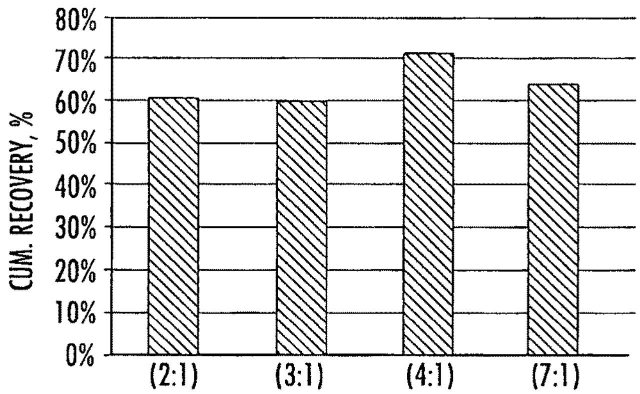
FIG. 11 is a graphical representation of cumulative particle recovery for different ratios of HEC-10 to PVP.

HEC-10 was found to be better than HEC-25 as a secondary dispersant in a binary system. To further improve the particle propagation, the ratio between PVP40 and HEC-10 was varied. FIG. 11 shows total cumulative particle recovery for different ratios of HEC-10 to PVP40, where 100 ppm of P-MWNT were dispersed using both polymers with a total polymer concentration of 1000 ppm, under high salinity conditions. For these two polymers, and under these conditions, a ratio of 4:1 (HEC-10:PVP40) yielded the highest particle recovery in propagation studies.

Figure 12A:
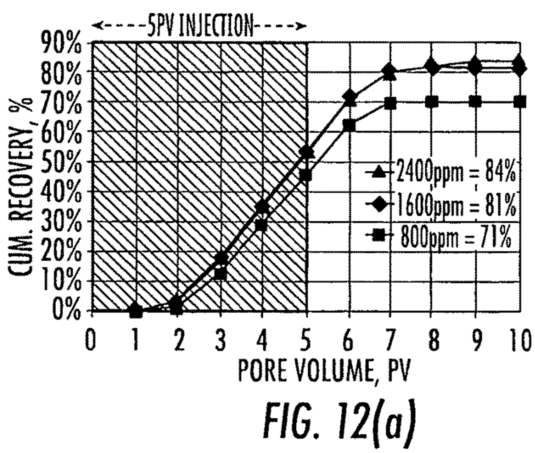
FIG. 12(*a*) is a graphical representation of differences in MWNT propagation (measured as cumulative particle recovery vs. pore volume) for different concentrations of HEC-10.
Figure 12B:
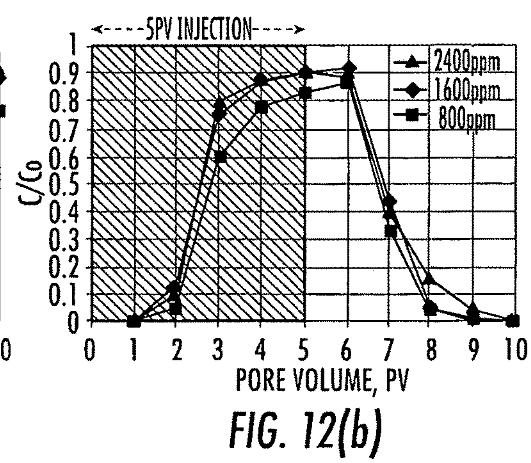

The possibility to create stable dispersions that are capable of propagating with a fixed concentration of PVP polymer was also investigated, e.g., 200 ppm of PVP, while changing the concentration of HEC-10 (800 ppm, 1600 ppm, and 2400 ppm). It was theorized that if the concentration of HEC-10 were increased, the dispersion would have a higher viscosity, which would allow a better sweep of the subterranean reservoir and a better propagation and delivery of the carbon nanohybrids in the porous media of the subterranean reservoir. Several experiments were performed, and it was found that 1600 ppm of HEC-10 would increase the particle recovery of P-MWNTs from 70% to 80% when a dispersion of 100 ppm of P-MWNTs, 200 ppm of PVP, and 1600 ppm of HEC-10 was injected into a sand-packed column, as shown in FIGS. 12(*a*) and (*b*). FIG. 12(*a*) shows cumulative recovery of MWNTs at three concentrations of HEC-10. FIG. 12(*b*) shows normalized concentrations at the three concentrations of HEC-10. FIG. 12(*a*) also shows a much faster breakthrough of nanoparticles at 1600 ppm of HEC-10 as the cumulative particle recovery starts increasing at a steeper slope in the plot. This phenomenon is produced as explained above, because of the increased viscosity of the dispersion.

Effect of Pre-Flush with Polymer

Figure 13A:
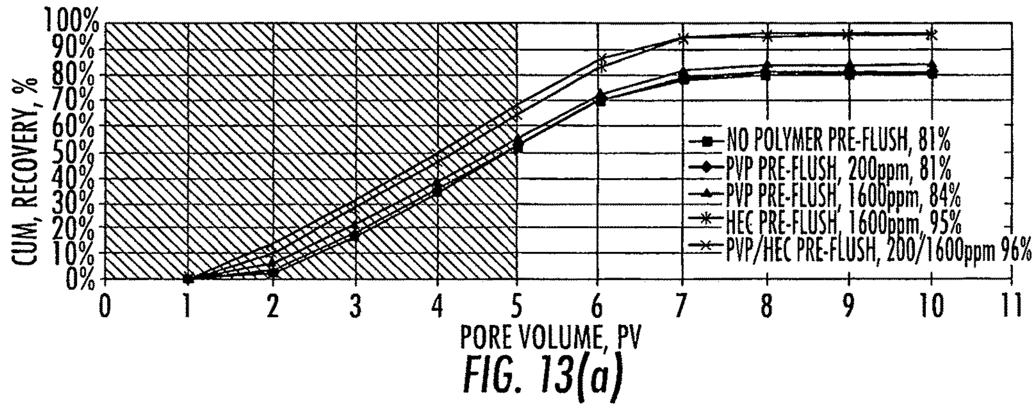
FIG. 13(*a*) is a graphical representation of differences in MWNT propagation (measured as cumulative particle recovery vs. pore volume) for different types of polymer pre-flush in a dual dispersant system.
Figure 13B:
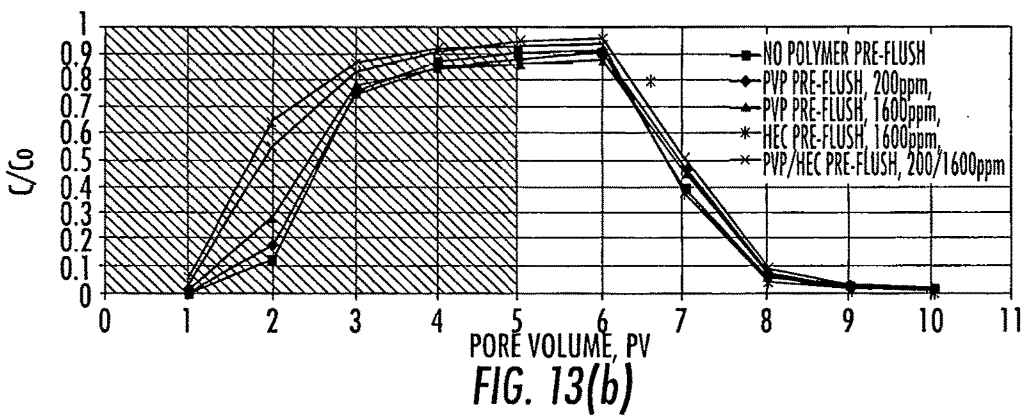

Since the cumulative particle recovery was not reaching 100%, and particle concentrations in the effluent did not reach the feed particle, the effect of a polymer pre-flush was studied in order to understand if this pre-flush would fill adsorption sites that would have otherwise trapped the carbon nanohybrid particles. Different polymer pre-flushes were performed to separate the differential effect of both polymers used. Therefore, four different experiments were designed and compared to the results previously obtained. One experiment included a polymer pre-flush of only PVP40 at a concentration of 200 ppm, a second experiment included a pre-flush of PVP but at a concentration of 1600 ppm, a third experiment was designed with a pre-flush of HEC-10 at 1600 ppm, and a fourth experiment included a pre-flush of a mixture of PVP and HEC-10 at concentrations of 200 ppm and 1600 ppm, respectively. FIGS. 13(*a*) and (*b*) show the results for these experiments.

A much faster breakthrough is observed in FIGS. 13(*a*) and 13(*b*) for all cases of polymer pre-flush compared to the base scenario (no polymer pre-flush). For example, in columns with a polymer pre-flush, the effluent concentration in the second pore volume was higher than that of the column without a polymer pre-flush. However, the main improvement was not produced by polymer pre-flush of PVP, which is known to be adsorbed to sandstone under high ionic environments, but rather when a pre-flush including HEC was performed (with or without PVP). Furthermore, increasing the PVP pre-flush concentration by 8 times (e.g., 200 ppm to 1600 ppm) did not significantly increase either particle breakthrough or total particle recovery. This shows that adsorption sites were still available for adsorption even with a PVP40 pre-treatment. This conclusion was also confirmed by the fact that the particle breakthrough and total particle recovery had minimal differences between the two experiments that include HEC-10 in the polymer pre-flush. These experiments of polymer pre-flush showed that HEC-10 is capable of covering more adsorption sites and avoiding future adsorption of polymer coated nanohybrids, such as when applied in an EOR process.

Effect of Filtration

Figure 14:
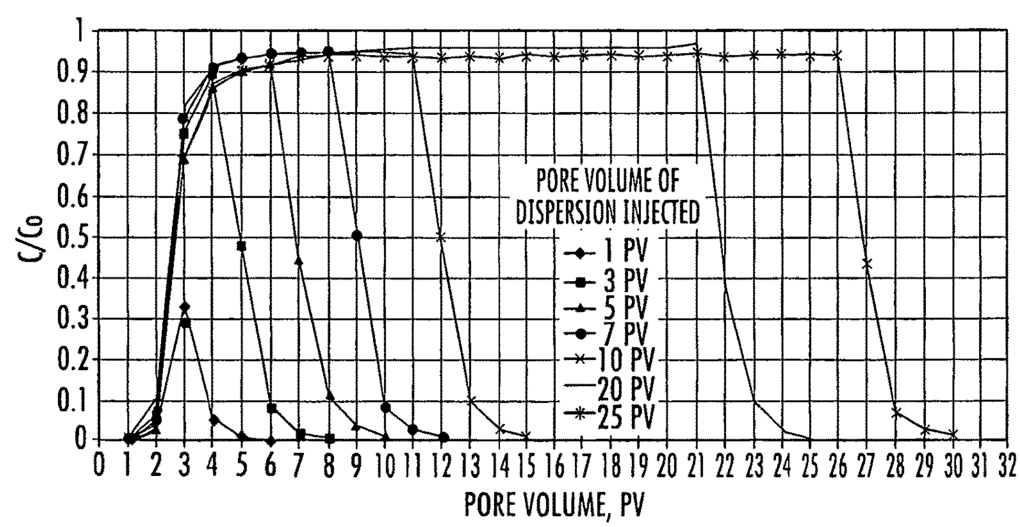
FIG. 14 is a graphical representation of normalized concentration plots for different volumes of injection.

FIG. 14 shows experiments performed using the dual dispersant system dispersion (100 ppm of P-MWNT, 200 ppm of PVP and 1600 ppm of HEC-10), where different volumes of the dispersion were injected in each experiment (varying from 1 pore volume to 25 pore volumes). A similar profile can be observed for all the experiments showing the repeatability and reproducibility of these propagation experiments. However, it can be seen that effluent particle concentration (indicating a percentage of CNTs that did not adsorb to sand) never equaled injection particle concentration (CNTs originally introduced or $C/Co \approx 1$) regardless of how much dispersion was injected. For all of the experiments in which the dispersion slug size was greater than seven pore volumes, a plateau was reached at $C/Co = \sim 0.95$. This indicates that the dispersion experienced constant particle retention for each PV beyond the seventh pore volume. The mechanism for this retention was likely "filtration" (i.e., capture of particles) or adsorption, as these are the main mechanisms by which the particle transport is retarded. In order to investigate the cause of the constant retention, the dispersion was pre-filtered using a 1 μm filter prior to injection. In this way, filtration effects would be essentially eliminated, and if the same phenomena was seen (C/Co<1), then this is essentially due to particle adsorption.

Figure 15A:
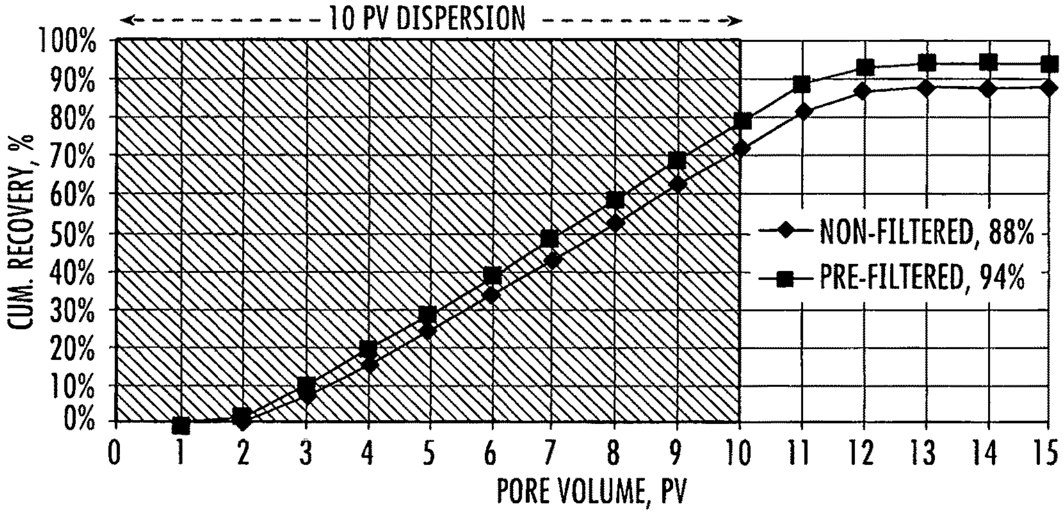
FIG. 15(*a*) is a graphical representation of differences in MWNT propagation (measured as cumulative particle recovery vs. pore volume) in a dual dispersant system as affected by filtration of the dispersion.
Figure 15B:
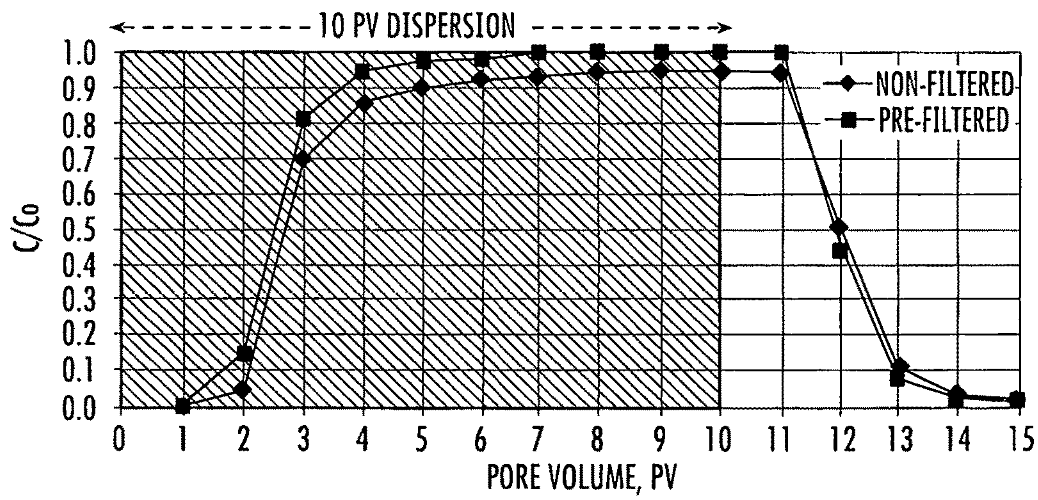

FIG. 15(*a*) compares the cumulative recovery of nanoparticles versus pore volumes injected through sand columns for two cases, pre-filtered and non-filtered dispersions. The shaded area corresponds to the pore volumes of injection. A pre-filtered dispersion passed through a 1 micron filter prior to injection showed better overall cumulative recovery as the fraction of particles that are not efficiently dispersed are filtered out from the dispersion by using the filter prior to dispersion injection. FIG. 15(*b*) compares the effluent normalized concentrations of pre-filtered and non-filtered dispersions propagated through sand packed columns versus pore volumes injected. The shaded area corresponds to the pore volumes of injection. This figure shows that the normalized concentration of effluent in non-filtered dispersion does not reach Co (injected concentration), or C/Co<1, regardless of the number of volumes injected. Injecting pre-filtered dispersions demonstrates that pre-filtered dispersion have reached the same as that of injection C/Co=1, and therefore there is no further retention of particles due to filtration.

There are several significant findings from this experiment: "filtration," as a mechanism of particle retention by the stone, can be essentially eliminated; compound particle adsorption did not occur such that all of the adsorption sites were saturated with substrate. Moreover, once all of the adsorption sites on the sand surface are saturated, these particle dispersions can propagate through sand-packed columns with zero particle retention.

Effect of Flow Rate

Propagation of nanoparticles and micro-particles in porous media has been found to be affected by the flow rate inside the media. It is expected that as flow velocity increases, adsorption of nanoparticles to sandstone grains is decreased and vice versa. In order to analyze the full effect of the flow rate, two new experiments were performed at flow rates of an order of magnitude higher and an order of magnitude lower than the previous experiments (i.e., 3 ml/min and 0.03 ml/min, respectively).

Figure 16A:
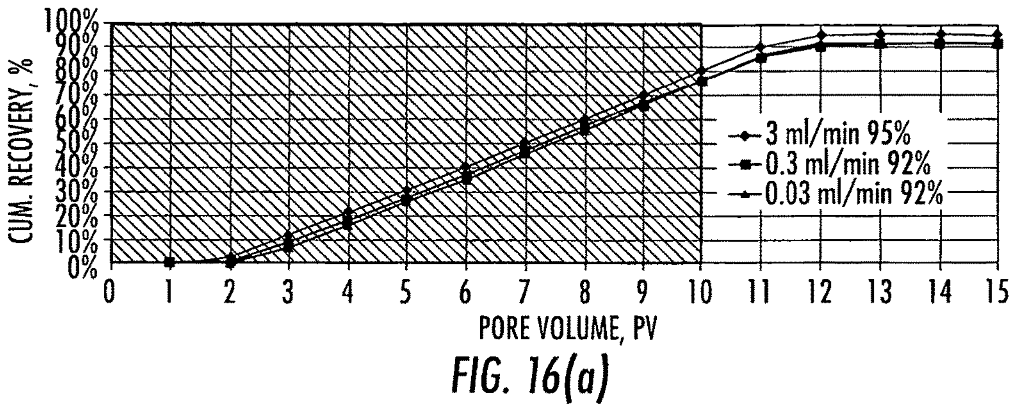
FIG. 16(*a*) is a graphical representation of differences in MWNT propagation (measured as cumulative particle recovery vs. pore volume) in a dual dispersant system as affected by flow rate.
Figure 16B:
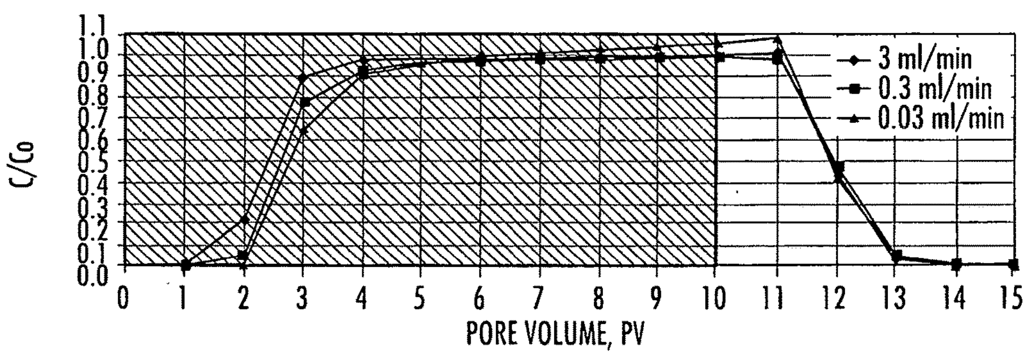

FIG. 16(*a*) examines an effect of flow rate change on cumulative nanoparticles recovery injected through sand column. The shaded area corresponds to the pore volumes of injection. Three flow rates were examined, 0.03, 0.3, and 3 ml/hr. FIG. 16(*a*) shows that there is no difference in overall recovery except at the high flow rate of 3 ml/hr, suggesting that the higher flow rate is not allowing enough time for adsorption to take place. FIG. 16(*b*) examines the effect of flow rate change on effluent normalized nanoparticles recovery injected through sand column. The shaded area corresponds to the pore volumes of injection. Three flow rates were examined, 0.03, 0.3, and 3 ml/hr. FIG. 16(*b*) shows that there is no difference in nanoparticle breakthrough except for the highest flow rate (3 ml/hr). There was a faster particle breakthrough for the highest flow rate and a slower breakthrough for the lower flow rate. This indicates that initially there is less adsorption at higher flow rates. However, it appears that the lower flow rate allows creation of a bank of carbon nanohybrids, which exits the column by the end of the dispersion injection, creating concentrations even higher than those of the injected dispersion. In general, the effect of flow rate on the general transport of the polymer-coated P-MWNTs through a porous medium appears to be minimal.

Summary

Adsorption of CNTs on crushed Berea Sandstone™ is affected mainly by salinity, temperature, method of polymer addition, and size of carbon nanohybrids (or nanohybrid aggregates). In general, the mass of CNTs adsorbed was smaller by more than an order of magnitude than what has been reported in literature for the adsorption of conventional surfactants. Higher temperatures tended to result in greater adsorption. The pretreatment of sand with polymers greatly reduced adsorption of CNTs because this pretreatment reduces the number of sites readily available for adsorption of the polymers used to disperse the CNTs. Systems that resulted in the least adsorption were in agreement with column studies performed: systems demonstrating reduced adsorption corresponded to systems showing better propagation in sand pack studies.

The dual dispersant (binary) system according to embodiments of the present disclosure was found to generate the proper characteristics of the P-MWNT dispersions for transport in porous media (e.g., a subterranean reservoir) under high ionic conditions, i.e., maximum reduction of particle losses due to adsorption or straining (filtration). In certain embodiments, the dual dispersant system comprised PVP40 (to initially generate stable dispersions of individual P-MWNTs) and HEC-10 (to maintain the CNT dispersion in a saline environment and reduce the adsorption onto sandstone of the PVP-coated nanoparticles).

Pre-flushing the column with a polymer solution had a desirable effect on the final transport of the particles through the porous media, occurring through the saturation of adsorption sites where the polymer-coated nanotubes may be adsorbed, improving overall the transport of these particles in porous media.

Although thorough sonication and centrifugation was used in the preparation of the carbon nanohybrid dispersion, there were still particle agglomerates at the end of this process, which were large enough to be filtrated out (captured) during transport through the sand pack. Thus, in at least one embodiment, additional filtration of the dispersion before being injected into a rock formation is performed, for example to reduce particle size in the dispersion to 1 micron or below.

Flow rate does not have an important effect on the interaction of the carbon nanohybrids with the sand from the crushed sandstone under flow conditions. Changing the flow rate by an order of magnitude resulted in minimal changes in the behavior during transport experiments in porous media.

Example 2

Other non-limiting examples of dispersion compositions according to presently disclosed inventive concepts are described below.

P-MWNTs as described above in Example 1 were used. DI Water was purified and deionized using three ion exchange units commercially obtained from Cole Parmer. Gum Arabic was commercially obtained from Acros Organics. Hydroxyethyl cellulose (HEC-10) was commercially obtained from Dow Chemicals. HEC-510K was commercially obtained from American Polymer Standards Corporation. HEC of molecular weight 250 kD, sodium nitrate, sodium chloride, and calcium chlorides were commercially obtained from Sigma-Aldrich. HPLC grade water was commercially obtained from Fisher Scientific. Berea sandstone cores were crushed with a ceramic mortar and sieved through a set of standard sieves (Sieves designations: #60/250 μm, #200/75 μm) and used in a range between 75 μm to 250 μm. The column used in this study was a low-pressure glass Chromatlex, commercially obtained from Kimble/Kontes Co.

Procedures

P-MWNTs were dispersed in API brine (10% by wt) or DI water with GA at the desired concentrations (indicated below) by sonication with a 600 W, 20 KHz horn-sonicator. HEC-10 stock solution was prepared and added to the dispersed solution of P-MWNTs to set an HEC-10:GA ratio of 8:1. Subsequently, the solution was sonicated again and centrifuged for one hour at 2000 rpm to eliminate any non-dispersed large aggregates of P-MWNTs that settled out of suspension. The adsorption experiments were made by adding 10 ml of dispersion into vials containing 2 g of crushed Berea sandstone. A stirring bar was added and the vials were sealed and placed on a stirrer for 24 hours. After this period, the concentration of all suspensions was measured on an UV-Vis spectrometer and compared to calibration standards of known concentrations. The differences in initial and final P-MWNT concentrations reflect the amount adsorbed to the sand in each measurement. The experiments were repeated at a wide range of CNT concentrations and polymer combinations. The salinity through all experiments was 10% by weight unless otherwise stated, keeping a constant Na:Ca ratio of 4:1 in all experiments.

Thermal stabilities of polymers of HEC-10 and GA were investigated by preparing vials of 20 ml of 2000 ppm and 5000 ppm of these polymers, respectively, and treating every vial for a different amount of time. For HEC-10 samples, the viscosity measurements were performed using a Brookfield viscometer. Gel permeation chromatography ("GPC") studies were performed using a GPC system comprising a model 515 HPLC pump, 717plus Autosampler, Ultrahydrogel 1000, and 486 Tunable Absorbance Detector all commercially available from Waters. The carrying face was a HPLC grade water with 0.1 M sodium nitrate to reduce the interaction between the polymer and the column packing.

A system similar to that used in Example 1 (see FIG. 1) was utilized for the measurements of particle propagation through packed porous media.

Adsorption Study

P-MWNT samples at a number of concentrations were dispersed in GA (first dispersant) by sonication for two hours. The second dispersant, HEC-10, was added and the suspensions were sonicated again for another 30 minutes. The final dispersions had concentrations in a range of from about 20 ppm to about 200 ppm of P-MWNTs, 200 ppm of GA, and 1600 ppm of HEC-10. Each dispersion was then centrifuged at 2000 rpm for one hour. All dispersions, unless otherwise stated, were prepared in API brine. Adsorption experiments were done by mixing 10 ml of dispersion with 2 g of crushed Berea Sandstone™ and stirring for 24 hours. A number of concentrations were tested, and the adsorption of P-MWNTs to sand was quantified using UV-Vis spectrometry.

Figure 17A:
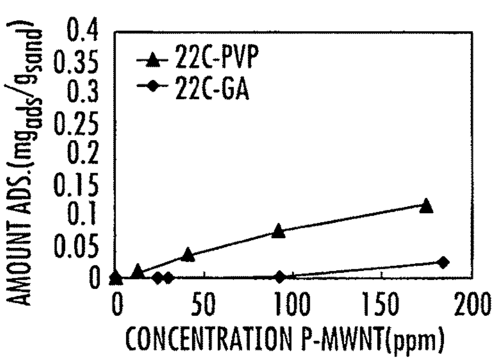
FIG. 17(*a*) is a graphical representation of adsorption of P-MWNTs using two different first dispersants (PVP and GA—Gum Arabic) at 22° C.
Figure 17B:
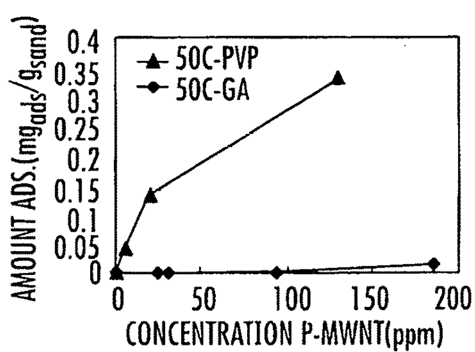

FIGS. 17(*a*) and (*b*) show a comparison between the adsorption of P-MWNT using GA as a first dispersant, and using PVP40 as a first dispersant, at two temperatures, 22° C. and 50° C. HEC-10 was used as the second dispersant in these dual dispersant systems. As discussed in Example 1, appreciable adsorption of MWNTs was observed using PVP40 as a primary dispersant. As indicated in FIGS. 17(*a*) and (*b*), P-MWNT dispersion made using GA as a first dispersant adsorbed less to the crushed Berea sand in comparison to a P-MWNT-PVP40 dispersion. Without wishing to be bound by theory, this can be explained by the high tendency of PVP40 to adsorb to crushed Berea Sandstone™ due to the electrostatic attraction that results from a difference in charge on the PVP40 pyrene ring and silanol groups on the sand particles.

Figure 18:
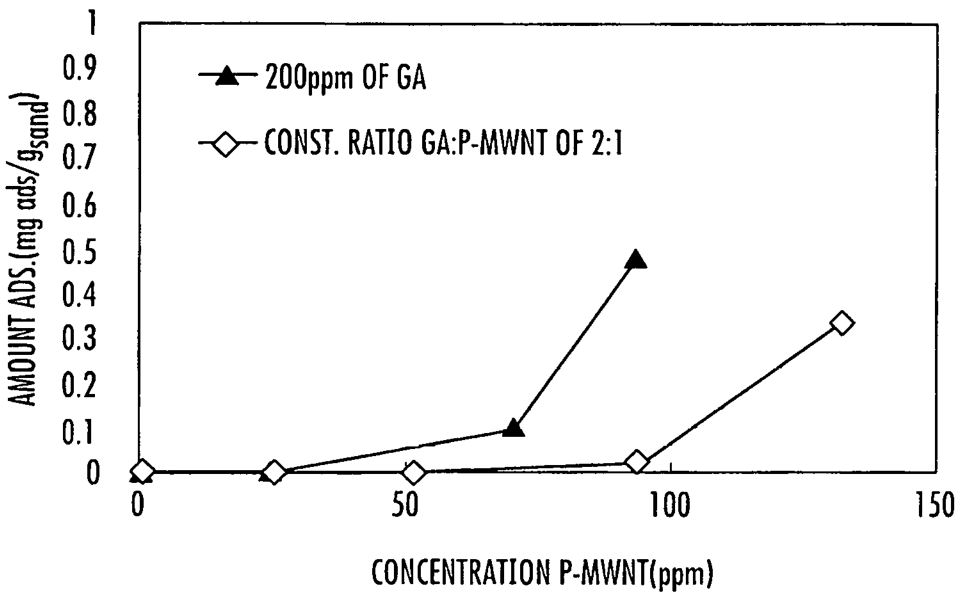
FIG. 18 is a graphical representation of adsorption of P-MWNTs with two concentrations of GA at 80° C.

Adsorption experiments were performed using a dispersion made from GA (first dispersant) and HEC-10 (second dispersion). The only change was that experiments were repeated at 80° C. Results are shown in FIG. 18, indicating low to negligible adsorption of P-MWNTs at a low concentration of about 25 ppm, and relatively high adsorption at a concentration of about 100 ppm of P-MWNTs. The relatively high adsorption at 80° C. is due to the low concentration of GA (200 ppm). Therefore, a constant ratio of GA to P-MWNT of 2:1 was used. The experiment was repeated using this constant ratio of GA to P-MWNT and total HEC-10 polymer concentration of 1600 ppm. Referring to FIG. 18, the use of the constant GA:P-MWNT ratio of 2:1 considerably reduced adsorption. The experiment was repeated at 80° C. and 90° C., with results shown in FIG. 19.

Although adsorption experiments performed using GA at 80° C. were successful in reducing adsorption, the adsorption was not entirely eliminated at this temperature. Filtration of centrifuged samples of the supernatant prior to the adsorption experiments was added. The dispersions were filtered using a 1 micron filter before addition to the crushed sand.

Figure 19:
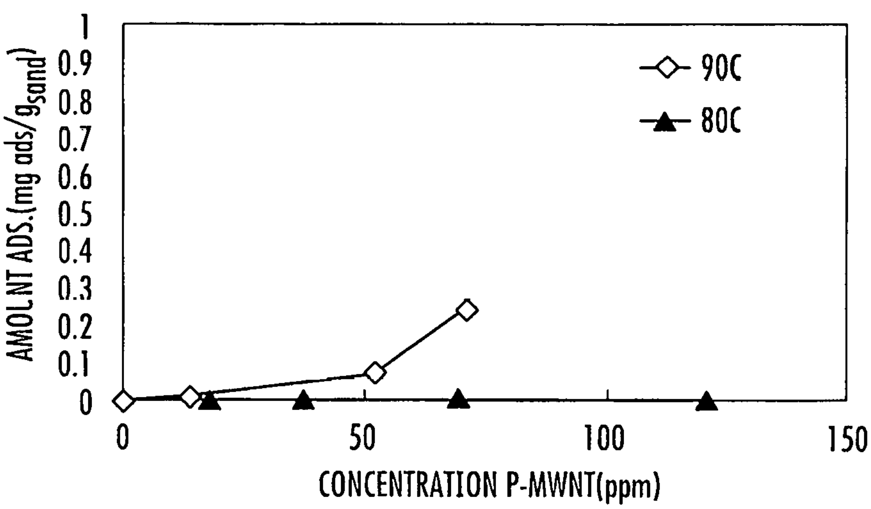
FIG. 19 is a graphical representation of adsorption of P-MWNTs using pre-filtered dispersions of P-MWNTs with GA and HEC-10 at 80° C. and 90° C.

FIG. 19 shows the adsorption measurements at 80° C. and 90° C. using pre-filtered P-MWNT dispersions comprising GA and HEC-10. The data series represented with triangles (▲) indicate almost zero adsorption at 80° C., and the data series represented with diamonds (♦) showed very low adsorption at 90° C., which corresponds to around 30% of total P-MWNT concentration.

Using the most stable dispersion, the adsorption experiments were repeated at 20% salinity ($Na^+$:$Ca^{2+}$, 4:1) to check for the effect of swamping the dispersion with higher ionic strength. As indicated by results shown in FIG. 20, it was found that this system of dispersing polymer is able to remain stable at this salinity and 80° C.

Thermal Stability of Polymers and GPC Measurements

Figure 20:
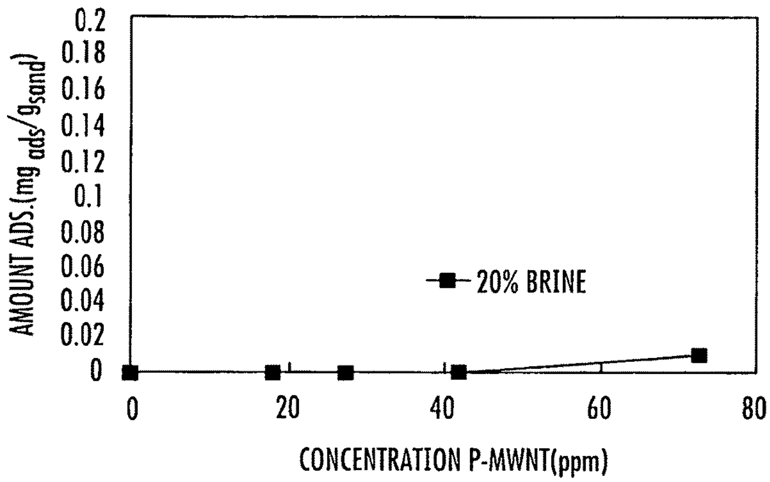
FIG. 20 is a graphical representation of adsorption of P-MWNTs using pre-filtered dispersions of P-MWNTs with GA and HEC-10 in 20% salinity brine at 80° C.

FIGS. 19 and 20 demonstrate that there was almost negligible adsorption of P-MWNTs at 80° C. and some adsorption at 90° C.; therefore, thermal stability measurements of fresh polymer samples were performed to understand the impact of high temperature on polymer stability. Stock solutions of 2000 ppm of HEC-10 and 5000 ppm of GA both in 10% brine were treated for a time ranging from 1 day up to 1 week and compared with fresh untreated polymer samples, both aerobically and anaerobically.

Figure 21A:
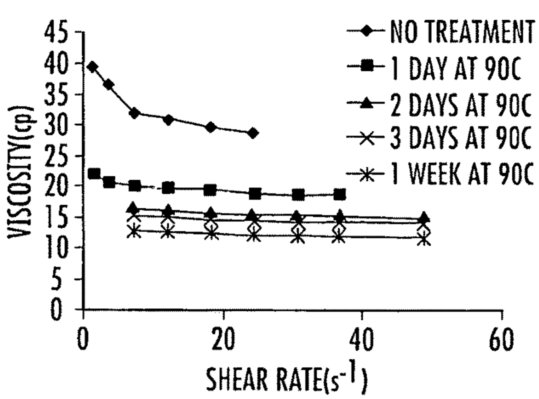
FIG. 21(*a*) is a graphical representation of HEC-10 (2000 ppm) viscosity measurements with different treatment times at 90° C. under aerobic conditions.
Figure 21B:
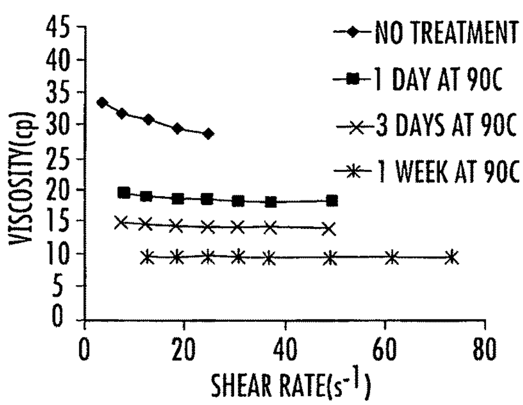

Referring to FIGS. 21(*a*) and (*b*), results are shown of viscosity measurements for HEC-10 in aerobic and anaerobic environments at 90° C., respectively. The trend of decreasing viscosity with increased treatment time indicates significant polymer degradation; however, there are no significant differences between the aerobic (FIG. 21(*a*)) and anaerobic (FIG. 21(*b*)) cases.

Figure 22A:
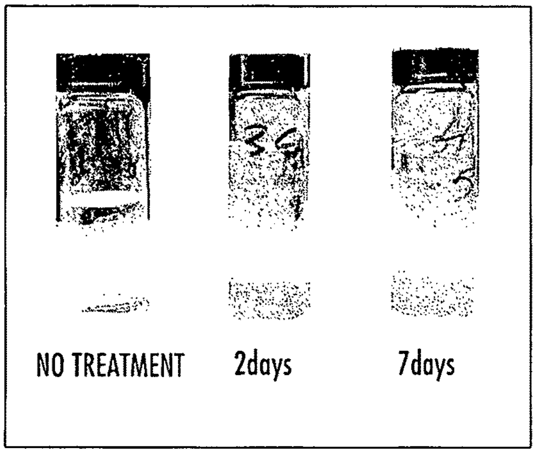
FIG. 22(*a*) is a visual observation of Gum Arabic (5000 ppm) treated at 90° C. under aerobic conditions.
Figure 22B:
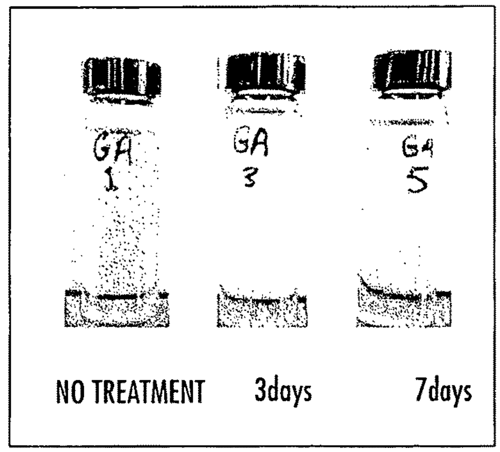

Similar experiments were repeated for 5000 ppm GA polymer solutions. Referring to FIGS. 22(*a*) and (*b*), visual observations are shown since no reliable viscosity measurements were obtained due to the low viscosity of the initial stock solution of GA. From the visual observations as shown in FIG. 22(*a*) (aerobic conditions) and FIG. 22(*b*) (anaerobic conditions), aerobic degradation of GA occurs at 90° C., which explains the loss indicated in FIG. 19 of some particles at this temperature in comparison to adsorption measurements at 80° C.

As a continuous effort to understand the dual effects of a polymer on stability, gel permeation chromatography of HEC-10 was performed to identify its molecular weight and the significance of this molecular weight on dispersion stabilization and any possible molecular weight changes that can take place due to the effect of sonication.

Figure 23:
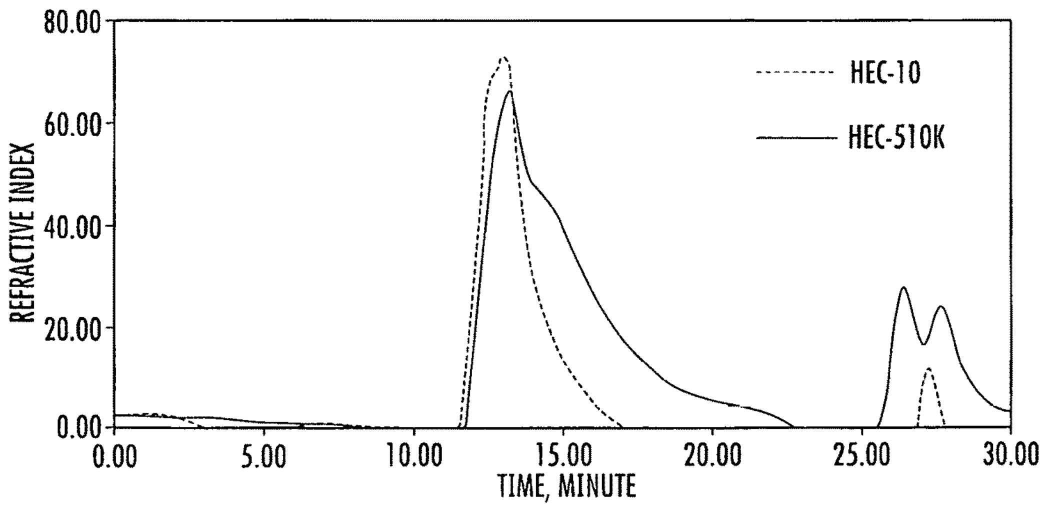
FIG. 23 is a graphical representation of differential refractometer measurements of HEC-10 and HEC-510K.

FIG. 23 shows the differential refractometer measurements performed on two samples of polymer, HEC-10 and a standard polymer of HEC with a molecular weight of 510 kD. Both polymers had the same retention time of about 13 minutes, which indicates that both polymers have similar molecular weights. The small peaks around 19 and 20 minutes correspond to possible gas bubbles or small segments of polymer escaping the GPC column at a later time.

Figure 24:
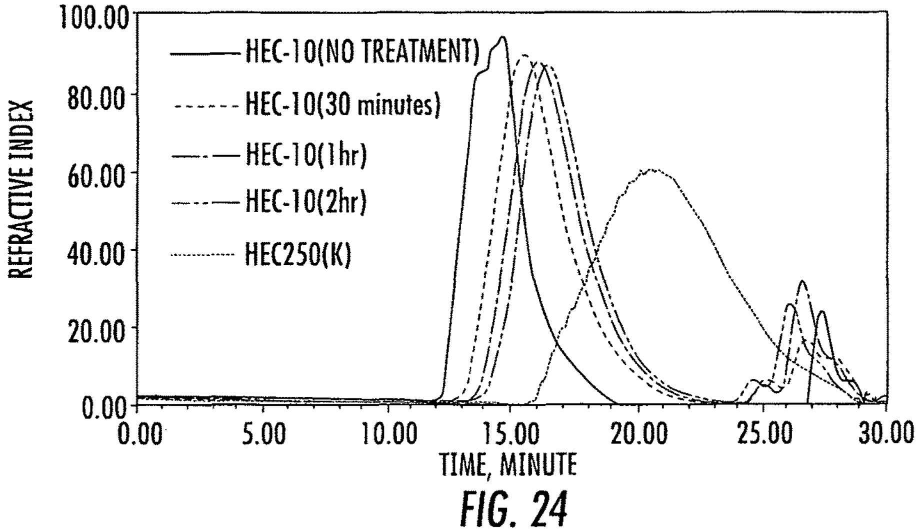
FIG. 24 is a graphical representation of the effect of sonication on HEC-10 molecular weight in comparison with HEC250K.

The effect of sonication on HEC-10 was investigated by sonicating a 100 ml solution containing 2000 ppm of HEC-10 for different times ranging from 30 minutes up to 2 hours. As indicated in FIG. 24, it was found that possible degradation could take place; however, this degradation does not appear to be severe. The degradation can be expected to reduce the polymer weight after two hours down to around 400-450 kD. This is not likely to significantly change the dispersion stability.

Column Studies

Experiments were performed using the column described earlier. Adsorption studies can depict the particle retention that may be experienced by the CNT hybrid dispersions in transport studies. However, factors like particle filtration and deviations from plug-flow in porous media contribute to the propagation of these particles. Sand-packed column tests were performed to compare P-MWNT propagation of two binary dispersant systems: (1) HEC-10 and PVP40; and (2) HEC-10 and GA. The HEC-10 concentration was 1600 ppm. The concentration of GA and PVP40 was 200 ppm for their respective dispersions. Column studies were performed at 25° C. (see FIGS. 25(*a*) and (*b*)) and 50° C. (see FIGS. 26(*a*) and (*b*)) for each system, with 10% salinity in both cases. Each of these dispersions was filtered through a 1 micron filter prior to the dispersion injection, so that filtration would not play a major role during propagation experiments. The results comparing both of the dispersions at 25° C. are shown in FIGS. 25(*a*) and (*b*).

Figure 25A:
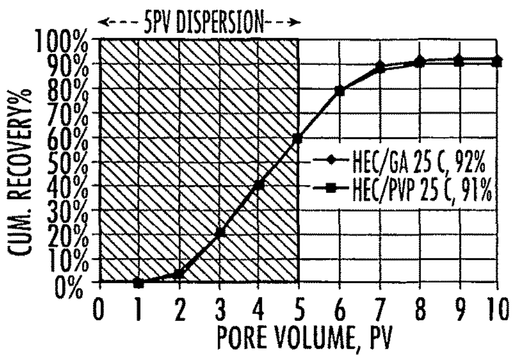
FIGS. 25(*a*) and (*b*) are graphical representations of propagation of P-MWNTs through crushed Berea sand packed columns at 25° C. using two dual dispersant dispersion compositions: HEC-10 plus PVP40, and HEC-10 plus GA.
Figure 25B:
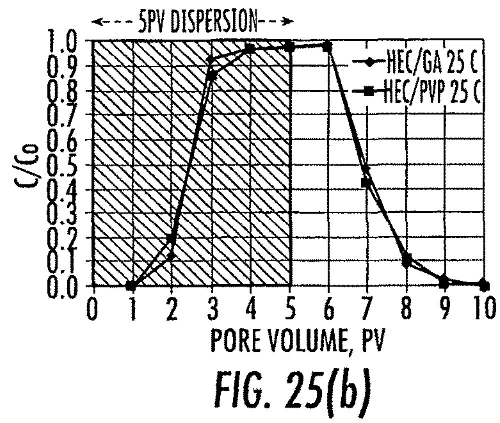

As shown in FIG. 25(*a*), both binary dispersant systems exhibited excellent propagation with negligible differences in particle recovery (92% and 91%) at 25° C. As shown in FIG. 25(*a*), the system with GA reached a higher normalized concentration in the third pore volume, while the normalized concentration in the second pore volume was lower than that of the system with PVP40. The variation in the particle breakthrough resulted in negligible differences in particle propagation overall. In application, these dispersions would propagate through the porous media of a subterranean reservoir while maintaining particle stability and inhibiting particle-rock interaction.

Figure 26A:
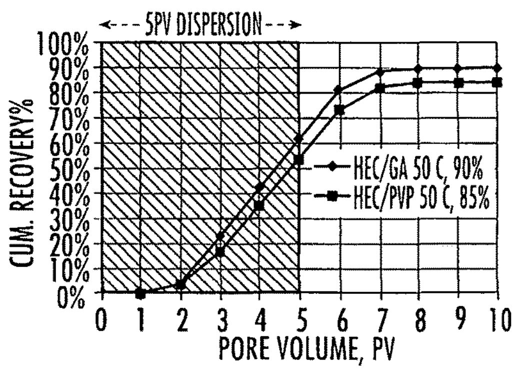
FIGS. 26(*a*) and (*b*) are graphical representations of propagation of P-MWNTs through crushed Berea sand packed columns at 50° C. using two dual dispersant dispersion compositions: HEC-10 plus PVP40, and HEC-10 plus GA.
Figure 26B:
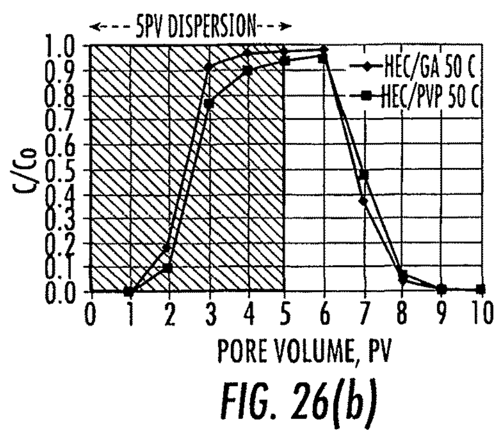

FIGS. 26(*a*) and (*b*) show the results from the propagation study of both binary dispersant systems at 50° C. The particle propagation with the HEC-10/PVP40 binary dispersant system suffered at the elevated temperature. As shown in FIG. 26(*a*), the particle recovery decreased 6%, and the breakthrough was slower. As shown in FIG. 25(*b*), in the fourth pore volume at 25° C., the normalized concentration of this system was nearly 1, while FIG. 26(*b*) indicates that at 50° C., the normalized concentration was about 10% less than that. Furthermore, the overall shape of the breakthrough curve of the HEC-10/PVP40 system suggests that the particles are eluting from the column slower at elevated temperatures. The HEC-10/GA binary dispersant system responded similarly at both temperatures. As indicated in FIG. 26(*a*), particle propagation was not hindered at the higher temperature. Elevated temperatures increased the adsorption of the particles onto collectors in the Berea sand when dispersed using HEC-10 and PVP40. Consequently, the propagation of this dispersion at higher temperatures yielded lower particle recovery. In addition, at a temperature of 50° C., no effect on the adsorption and propagation of the particles when dispersed with HEC-10 and GA was observed.

Example 3

In certain embodiments, the present disclosure describes methods for propagating dispersed carbon nanotube hybrids through porous media and rock matrix. Core flooding experiments were conducted to demonstrate the applicability of utilizing CNT hybrids in subterranean reservoir applications. Dispersion compositions containing P-MWNT, GA, and HEC-10 were prepared and filtered using 1 micron filter paper to remove aggregates greater than 1 micron. The dispersion was then injected through cores ranging from 200-460 mD. More than 80% of the injected particles propagated successfully through the core with increased retention of nanoparticles in the presence of oil inside the core due to the CNT hybrids preferential adsorption to the oil phase.

Procedures

P-MWNTs were dispersed in brine with GA at the various concentrations by sonication with a 600 W, 20 KHz horn-sonicator. HEC-10 was then added to the dispersed solution of P-MWNTs in a quantity to achieve a HEC-10:GA ratio of 8:1. Subsequently, the solution was sonicated again and centrifuged for one hour at 2000 rpm to eliminate any non-dispersed large aggregates of P-MWNTs that settled in the bottom of the centrifuge vial. The concentrations of all suspensions were measured on an UV-Vis spectrometer and compared to calibration standards of known concentrations. The salinity through all experiments was 10% by weight, keeping a constant Na:Ca ratio of 4:1 in all experiments.

Core flooding experiments of stable dispersions were tested in a core flood test setup 22. The core flood setup depicted in FIG. 27 included a syringe pump 24 filled with mineral oil connected to four pushing pistons 26, which were filled with injected fluids. A core holder 28 holding a core up to 6 inches in length was situated inside a heating oven (not shown) connected to a temperature controller (not shown). Three pressure transducers (not shown) were connected to a computer (not shown) to record pressure changes during the experiment. The effluent stream of the core holder 28 was connected to a sample collector 30. Samples from the effluent were collected and analyzed using UV-Vis spectrometry and converted into concentrations using calibration curves.

A dispersion of P-MWNTs comprising 100 ppm of P-MWNTs, 200 ppm of GA, and 1600 ppm of HEC-10 was prepared according to the method in Example 2 using API brine as discussed above. The solution was centrifuged for 1 hour at 2000 rpm and filtered using 1 micron glass microfiber filter papers (grade B) commercially obtained from the Lab Depot Inc.

Experiments

Figure 28A:
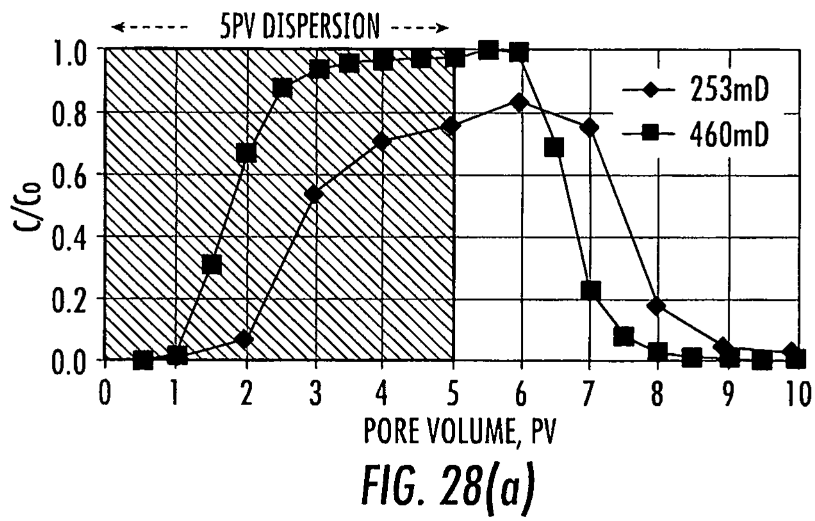
FIG. 28(*a*) is a graphical representation of an effect of core permeability (253 mD vs. 460 mD) on cumulative recovery of a P-MWNT/GA/HEC-10 dispersion based on a normalized concentration (C/Co).
Figure 28B:
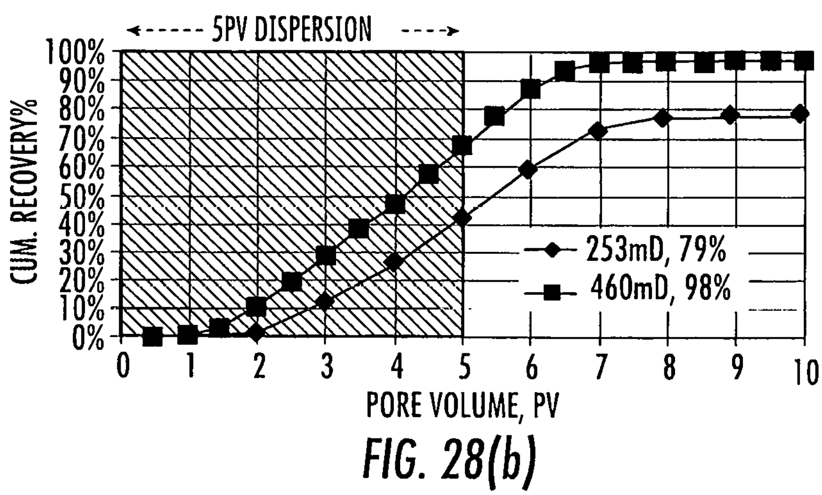

A first set of experiments was performed using two cores of Berea Sandstone™ with measured permeabilities of 460 and 253 mD, respectively. Results of a breakthrough of a 100 ppm dispersion of nanotubes are shown in FIGS. 28(*a*) and (*b*). The cores tested were both 1 inch in diameter. Five pore volumes of dispersion were injected at 50° C. and 5 pore volumes of brine post flush. As indicated in FIG. 28(*a*), it was observed that the concentration of CNT hybrids approached C/Co of 1 after 5 pore volumes of dispersion injection with the 460 mD core. The core with the lower permeability of 253 mD did not reach a plateau of C/Co after 5 pore volumes.

As indicated in FIG. 28(*b*), the total cumulative recovery was 98% for the 460 mD core and 79% for the 253 mD core. The transport of particles showed little to no retention at the sand face (the entrance of the core), so that the dispersion was propagated successfully. Increased retention at the sand face is correlated with reduced nanoparticle propagation.

Figure 29A:
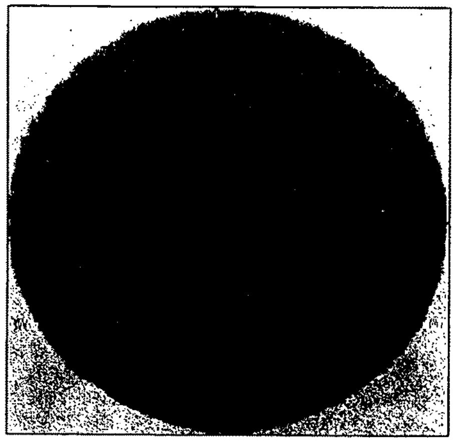
FIG. 29(*a*) is a digital photograph of a core plug face after propagation of MWNT through a core having a permeability of 460 mD.
Figure 29B:
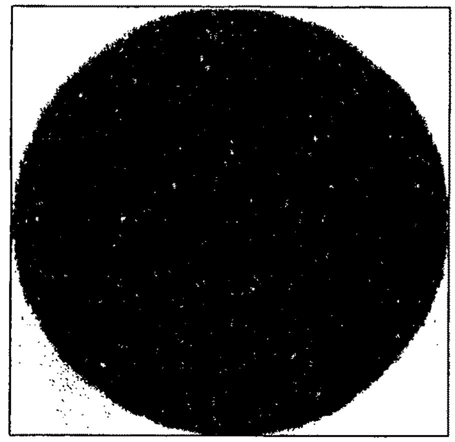

Referring to FIGS. 29(*a*) and (*b*), shown therein are digital photographs of the sand faces of the 253 mD and 460 mD cores, respectively. The 253 mD core was pre-flushed with 1600 ppm of HEC-10. The entrapments of particles at the sand face were very low. Despite the fact that there was 79% recovery for this core, some of the particles apparently were trapped at the sand face due to size exclusion due to the polymer pre-flush. The experiment using the 460 mD core was done with sonicated polymer pre-flush and that greatly eliminated particle retention at the sand face. It is noteworthy to mention that the experiments described below were done without polymer pre-flush and demonstrated outstanding propagation.

Verification of Core Flooding (Standardized Testing)

Figure 30A:
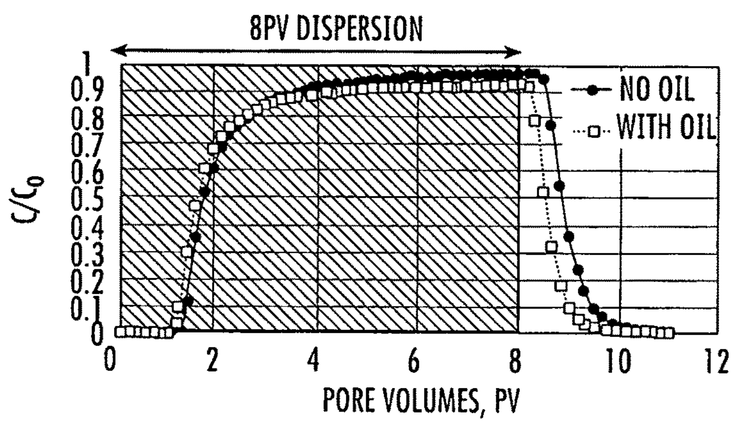
FIG. 30(*a*) is a graphical representation of an effect of oil on cumulative recovery of a P-MWNT/GA/HEC-10 dispersion based on a normalized concentration (C/Co).
Figure 30B:
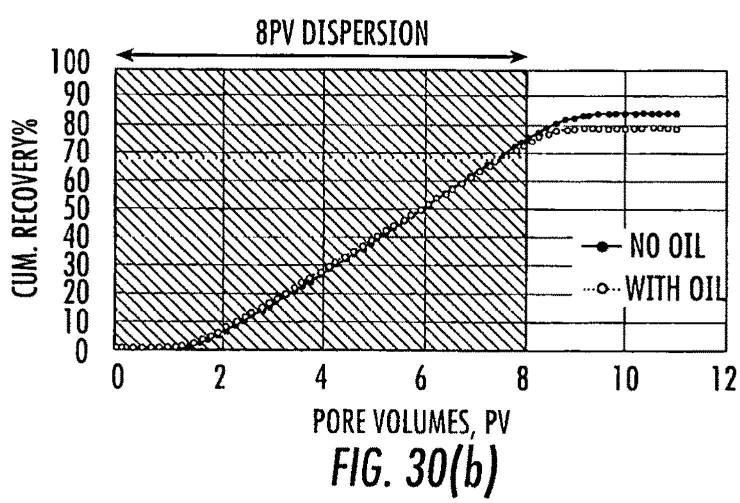

Core flooding experiments of the P-MWNT dispersions through core samples were repeated at an outside laboratory. Two tests were run using the P-MWNTs described in Example 3. All dispersions comprised 10% (by weight) brine with a sodium chloride:calcium chloride ratio of 4:1. Table 1 lists details for both two experiments and physical properties of the cores used. Two cores were pre-flushed with 10% brine prior to the test. Brine flow rate was ramped up to 40 ml/min to remove loose clay particles from the core pores. One core was treated (infused) with an oil and another core was left untreated by oil. In the untreated core, the brine flow rate was ramped up to 40 ml/min then slowed down to 2 ml/min and maintained until pressure stabilized. Another core was injected with a ¼ pore volume amount of an oil (Isopar™ L oil), and the flow rate of brine was ramped up to 40 ml/min. Any oil coming out of the column was collected, then the flow rate of brine was decreased to 2 ml/min, and the pressure was stabilized prior to injection of the P-MWNT dispersion. The residual oil saturation prior to P-MWNT dispersion injection was found to be 0.21 $S_{or}$. Eight pore volumes of the 100 ppm P-MWNT dual dispersant dispersion were injected into each core followed by 4 pore volumes of brine post-flush. FIGS. 30(*a*) and (*b*) show the concentration and cumulative recovery results, respectively, from both experiments.

TABLE 1

| | |
|---|---|
| Klinkenberg Permeability, mD | 200 |
| Temperature, ° C. | 65.5 |
| Salinity, % | 10 |
| Core length, inches | 6 |
| Core diameter, inches | 1.5 |
| Flow rate, ml/min | 2 |
| Berea 400 core porosity, % | 20 |

Propagation data showed faster breakthrough for the case where oil was present due to the lesser pore volume. This is because of the fraction of the pore volume taken up by the oil. Table 2 lists maximum concentrations attainable for both tests, overall cumulative recovery, and amount adsorbed per gram of dry core ("gcore").

TABLE 2

| Core | Without Oil | With Oil |
|---|---|---|
| Maximum C/C.° | 97 | 95 |
| Cumulative Recovery, % | 85 | 80 |
| Adsorption, mg/gcore | 0.03 | 0.04 |

Figure 31A:
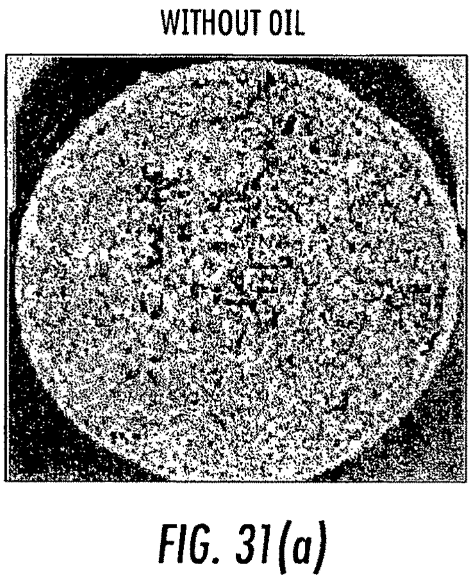
FIG. 31(*a*) is a digital photograph of a core face of a core used in FIGS. 31(*a*) and (*b*) without oil.
Figure 31B:
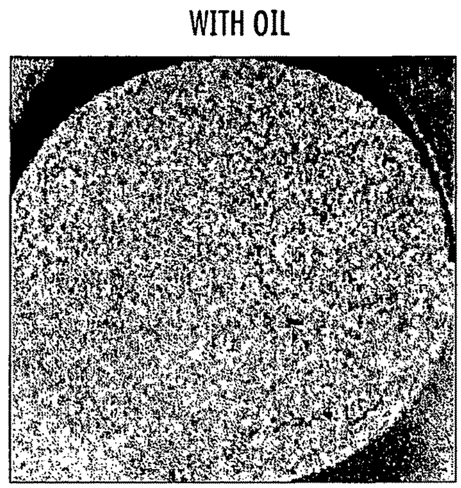

Table 2 shows that there was 33% greater retention (adsorption) and 5% less cumulative recovery of nanoparticles in the core treated with oil. Without wishing to be bound by theory, it is expected that the difference in adsorption was due to retention of the CNT hybrids due to interfacial activity of the CNT hybrids at the oil/water interface. From inspecting C/Co, it can be seen that the concentration never reached a plateau in all cases, which signifies the possibility of saturating available adsorption sites allowing for the possibility of further injections to propagate completely without retention. FIGS. 31(*a*) and (*b*) show digital photographs of the sand faces for both cores, which show small sparse patches of particles deposited at the core entrances. This indicates that the nanoparticles could be used for the detection of oil phase presence so could act as contrast agents. For example, the increased retention of nanoparticles in the presence of oil can be used to predict the extent of oil saturation in an uncharacterized formation. In this sense, they can act as tracers. In another example, injecting CNTs having NMR- or EPR-sensitive compounds attached thereto into a subterranean reservoir can provide useful information about the formation. Further, by logging while drilling, NMR spectroscopy and EPR spectroscopy can be used to detect these nanoparticles at different depths of penetration of the reservoir formation. For example, see U.S. Pat. No. 3,993,131, "Tracing flow of petroleum in underground reservoirs," which is hereby incorporated by reference herein.

Figure 32:
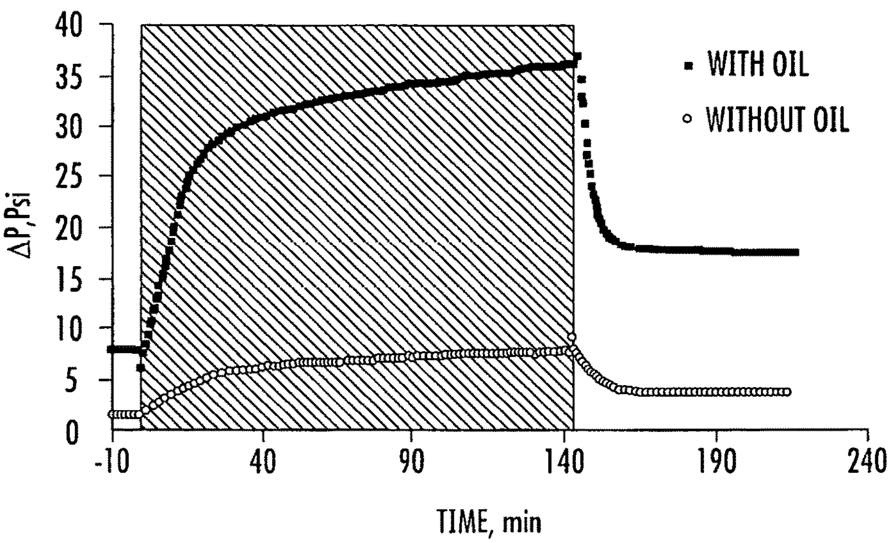
FIG. 32 is a graphical representation of pressure drop following injection of a P-MWNT/GA/HEC-10 dispersion in cores with an oil and without an oil.

The pressure drop, ΔP, for the two tests was recorded as well and is shown in FIG. 32. The shaded area in the graph corresponds to injection of the dispersion into the core. In the case of no oil, the pressure drop was not significant (~3 psi). In the presence of oil, less pore volume was available because of the oil phase, which contributed to the greater drop in the pressure. The less accessible pore volume (due to the presence of oil) also resulted in faster breakthrough of particles as shown in FIG. 30(*a*).

High Concentration Core Flooding Experiment

Figure 27:
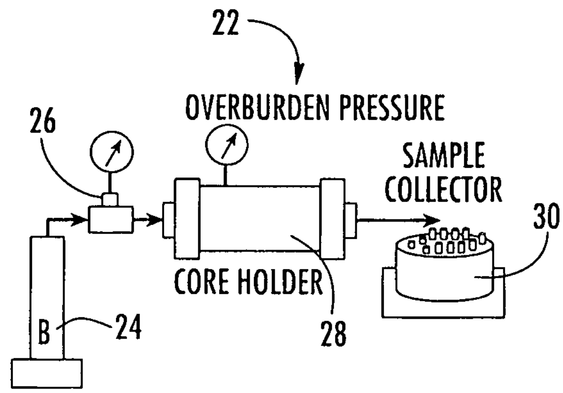
FIG. 27 is a setup of a core flooding test unit.

An experiment was conducted using the same setup described in FIG. 27. The P-MWNT concentration was twice as much (200 ppm) as the earlier experiments; otherwise, the dispersion was prepared as described elsewhere in Example 3. Further, the dispersion was filtered twice using 1 micron filter paper. The core tested was 200 mD with 1 inch in diameter, 2 inches length. The dispersion flow rate was 1 ml/min. Brine was allowed to flow at 1 ml/min, and once the pressure stabilized, 8 pore volumes of dispersion were injected followed by 4 pore volumes of brine post-flush. The temperature was kept at 65.5° C. The concentration and cumulative recovery results for this experiment are shown in FIGS. 33(*a*) and (*b*), respectively.

Figure 33A:
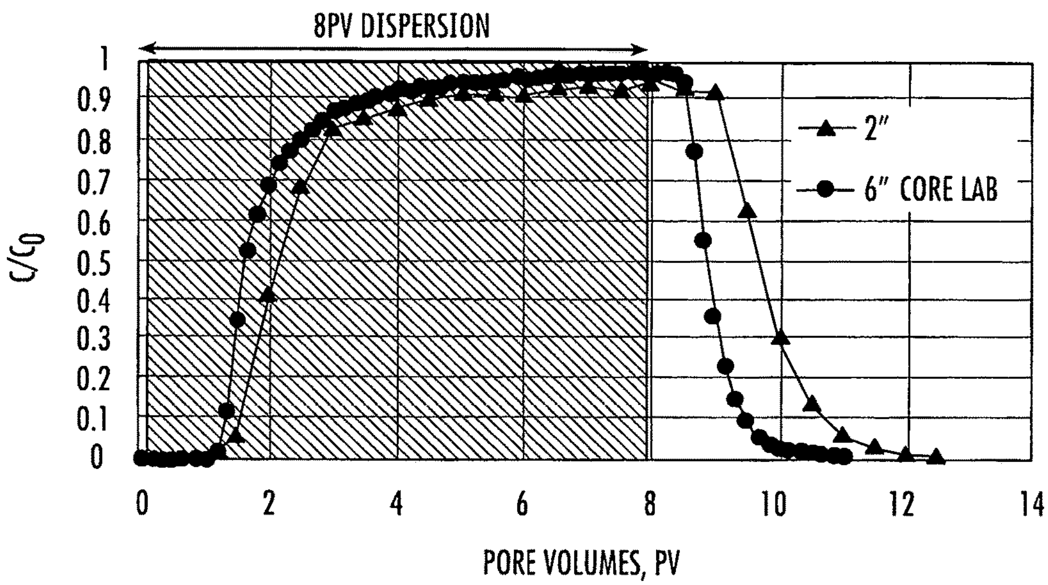
FIG. 33(*a*) is a graphical representation of a comparison of an effect of core thickness on the cumulative recovery of MWNTs from a P-MWNT/GA/HEC-10 dispersion based on a normalized concentration (C/Co).
Figure 33B:
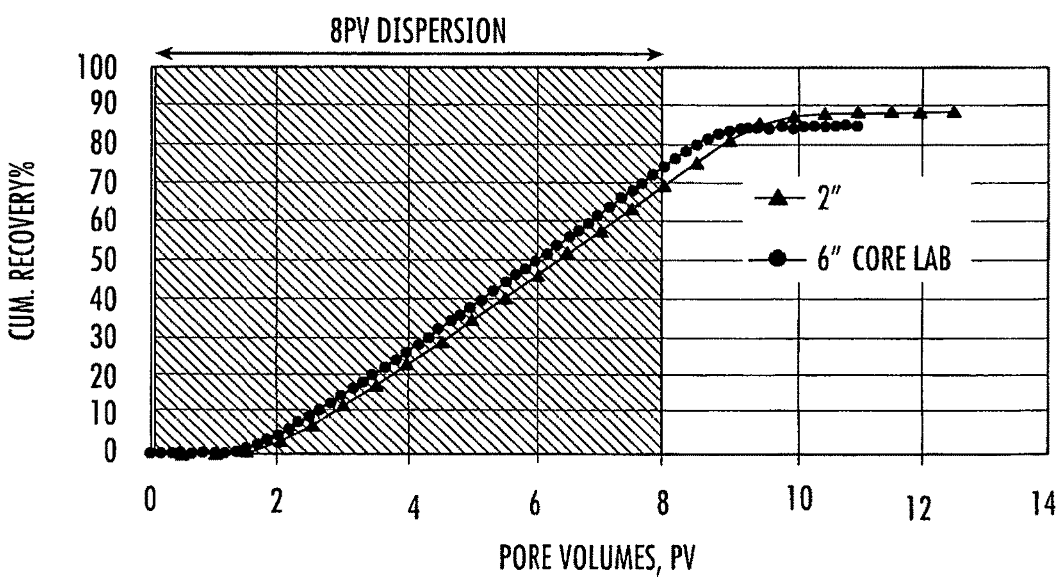

FIGS. 33(*a*) and (*b*) show a slightly higher overall recovery when the 2 inch core is used in comparison with the 6 inch core in FIG. 30(*b*). This is expected because the dispersion used with the 2 inch core was double-filtered. As indicated in FIG. 33(*b*), the total cumulative recovery using the 2 inch core was 88.5% in comparison to 85% for the 6 inch core. The adsorption was 0.02 mg/gcore for the 2 inch core in comparison to 0.03 mg/gcore for the 6 inch core.

Summary

Propagation of CNT hybrids through cores having permeability of 200 mD and 6 inch length was achieved. The particle recoveries through all core runs were greater than 80%, with concentrations reaching as high as 97% of the injected concentration. Adsorption values were equal or less than 0.03 mg/gcore. The increase in P-MWNT adsorption observed in the presence of oil phase inside the porous media suggests adsorption of P-MWNT at the water/oil interface. Successful propagation and interfacial activity of P-MWNT can be utilized towards the use of CNT hybrids in delivery of substances including, but not limited to, catalytic particles, contrast agents, and wettability modifiers into a subterranean reservoir, such as for an EOR application.

Figure 34:
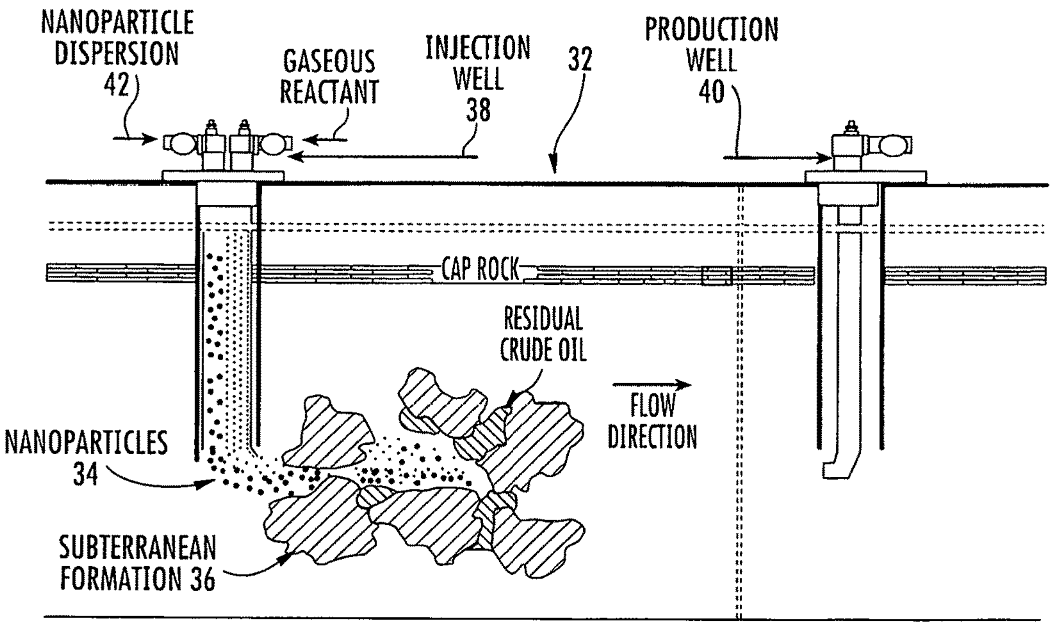
FIG. 34 depicts systems and methods of applications of embodiments of the presently disclosed inventive concepts within a subterranean reservoir.

FIG. 34 is a schematic representation of a system and method 32 for injecting embodiments of nanoparticles 34 disclosed herein into a subterranean formation 36, as performed in accordance to a non-limiting embodiment of the presently disclosed inventive concepts. The figure shows one of many injection strategies by which the nanoparticles 34 may be injected or co-injected deep within such a subterranean formation 36 and propagate from an injection well 38 to a production well 40. A dispersion 42 comprising nanoparticles 34 configured in accordance with embodiments of the present disclosure may be injected in the subterranean formation 36 via one or more injection wells 38, utilizing any feasible pumping means. As the nanoparticles 34 travel inside the subterranean formation 36, they may encounter the oil/water/gas interface and perform their catalytic role. The nanoparticles 34 may be intended to remain within the subterranean formation 36 to perform certain roles, such as for providing a contrast agent for imaging purposes. Or, the nanoparticles 34 may be recovered at a production, or recovery, well 40 for further analysis.

What is claimed is:

1. A method, comprising:

introducing a dispersion comprising carbon nanotube hybrids into a subterranean formation, the carbon nanotube hybrids comprising:

a plurality of carbon nanotubes ("CNTs");

a polymeric first dispersant at least partially surrounding the CNTs, forming first dispersant-CNT composites;

a polymeric second dispersant at least partially surrounding the first dispersant-CNT composites, forming the carbon nanotube hybrids; and wherein the polymeric second dispersant is stable at a salinity of at least about 10% by weight at a temperature in a range of at least about 25° C. to about 90° C.

2. The method of claim 1, wherein the polymeric second dispersant is stable at a salinity in a range of at least about 10% to about 20% by weight at a temperature in a range of at least about 25° C. to about 80° C. 50° C.

3. The method of claim 1, wherein the polymeric first dispersant is selected from the group consisting of gums, polyvinyl pyrrolidones (PVPs), polyacrylamides (PAMs), polyvinyl alcohols (PVAs), and polyacylamides (PAAs).

4. The method of claim 1, wherein the polymeric first dispersant is a gum selected from the group consisting of Gum Arabic (GA), Xanthum gum (XA), Guar gum (GG), agar, alginic acid, beta-glucan, carrageenan, chicle gum, dammar gum, gellan gum, gum ghatti, gum tragacanth, karava gum, locust bean gum, mastic gum, spruce gum, tara gum, and diutan.

5. The method of claim 1, wherein the polymeric first dispersant is a Gum Arabic.

6. The method of claim 1, wherein the polymeric first dispersant is a polyvinyl pyrrolidone.

7. The method of claim 1, wherein the polymeric second dispersant is a cellulose derivative selected from the group consisting of hydroxyethyl celluloses (HEC), hydroxypropyl cellulose, carboxymethyl cellulose, and carboxymethylhydroxyethyl cellulose.

8. The method of claim 1, wherein the polymeric second dispersant is a hydroxylethyl cellulose.

9. The method of claim 1, wherein the dispersion has a CNT concentration in a range of about 2 ppm to about 1000 ppm.

10. The method of claim 1, wherein the dispersion has a polymeric second dispersant:polymeric first dispersant concentration ratio in a range of about 2:1 to about 10:1.

11. The method of claim 1, wherein the polymeric first dispersant has a concentration in a range of about 100 ppm to about 2000 ppm.

12. The method of claim 1, further comprising:

imaging the subterranean formation by utilizing the carbon nanotube hybrids as a contrast agent.

13. A system, comprising:

a first apparatus suitable for introducing a dispersion comprising carbon nanotube hybrids into a subterranean formation, the carbon nanotube hybrids comprising:

a plurality of carbon nanotubes ("CNTs");

a polymeric first dispersant at least partially surrounding the CNTs, forming first dispersant-CNT composites;

a polymeric second dispersant at least partially surrounding the first dispersant-CNT composites, forming the carbon nanotube hybrids, wherein the polymeric second dispersant is stable at a salinity of at least about 10% by weight at a temperature in a range of at least about 25° C. to about 90° C.; and a second apparatus suitable for imaging the subterranean formation by utilizing the dispersion comprising carbon nanotube hybrids as a contrast agent.

14. The system of claim 13, wherein the polymeric second dispersant is stable at a salinity in a range of at least about 10% to about 20% by weight at a temperature in a range of at least about 25° C. to about 50° C.

15. The system of claim 13, wherein the polymeric first dispersant is selected from the group consisting of gums, polyvinyl pyrrolidones (PVPs), polyacrylamides (PAMs), polyvinyl alcohols (PVAs), and polyacylamides (PAAs).

16. The system of claim 13, wherein the polymeric first dispersant is a polyvinyl pyrrolidone.

17. The system of claim 13, wherein the polymeric second dispersant is a hydroxylethyl cellulose.

18. The system of claim 13, wherein the dispersion has a CNT concentration in a range of about 50 ppm to about 500 ppm.

19. The system of claim 13, wherein the dispersion has a polymeric second dispersant:polymeric first dispersant concentration ratio in a range of about 3:1 to about 8:1.

20. The system of claim 13, wherein the polymeric second dispersant has a concentration in a range of about 500 ppm to about 5000 ppm.

* * * * *